(12) United States Patent
Palese et al.

(10) Patent No.: US 12,440,202 B2
(45) Date of Patent: Oct. 14, 2025

(54) KNOTLESS BONE ANCHOR SYSTEM AND METHOD

(71) Applicant: Biomet Manufacturing, LLC, Warsaw, IN (US)

(72) Inventors: Christopher M. Palese, Warsaw, IN (US); Nathan A. Winslow, Scottsdale, AZ (US)

(73) Assignee: Biomet Manufacturing, LLC, Warsaw, IN (US)

( * ) Notice: Subject to any disclaimer, the term of this patent is extended or adjusted under 35 U.S.C. 154(b) by 356 days.

(21) Appl. No.: 18/113,998

(22) Filed: Feb. 24, 2023

(65) Prior Publication Data
US 2023/0320717 A1 Oct. 12, 2023

Related U.S. Application Data

(60) Provisional application No. 63/313,565, filed on Feb. 24, 2022.

(51) Int. Cl.
*A61B 17/04* (2006.01)
*A61B 17/86* (2006.01)
*A61F 2/08* (2006.01)

(52) U.S. Cl.
CPC ........ *A61B 17/0401* (2013.01); *A61B 17/864* (2013.01); *A61F 2/0811* (2013.01); (Continued)

(58) Field of Classification Search
CPC ............ A61F 2/0811; A61F 2002/0841; A61F 2/0805; A61F 2002/0888; A61F 2002/0858; A61F 2002/0817; A61F 2002/0852; A61B 2017/044; A61B 2017/0409; A61B 17/0401; A61B 2017/0445; A61B 2017/045; A61B 2017/0446; A61B 2017/0448; A61B 2017/0451; A61B 2017/0453; A61B 2017/0458; A61B 2017/0464; A61B 2017/0412; A61B 2017/0414; A61B 2017/0438; A61B 17/8645; A61B 2017/0474; A61B 2017/0475
See application file for complete search history.

(56) References Cited

U.S. PATENT DOCUMENTS 6,544,281 B2  4/2003  Elattrache et al.
9,005,246 B2  4/2015  Burkhart et al.
(Continued)

*Primary Examiner* — Katherine Shi
(74) *Attorney, Agent, or Firm* — Schwegman Lundberg & Woessner, P.A.

(57) ABSTRACT

A method of soft tissue repair comprises attaching at least one suture to a soft tissue to be affixed to a bone structure, positioning a tissue anchor on a driver, positioning a cinching suture alongside the driver, engaging a catch of the cinching suture with a stop of the driver, capturing the at least one suture attached to the soft tissue in a loop of the cinching suture positioned proximate a distal tip of the driver, drawing the at least one suture toward the distal tip of the driver by pulling at least a first portion of the cinching suture; preventing the cinching suture from passing by the driver by engaging the catch with the stop, and installing the tissue anchor into the bone structure to secure the at least one suture in the bone structure by interference-friction fixation between the tissue anchor and the bone structure.

21 Claims, 16 Drawing Sheets

(52) U.S. Cl.
CPC ............ *A61B 2017/0409* (2013.01); *A61B 2017/0445* (2013.01); *A61B 2017/0458* (2013.01); *A61B 2017/0464* (2013.01); *A61B 2017/0475* (2013.01); *A61F 2002/0817* (2013.01)

(56) References Cited

U.S. PATENT DOCUMENTS

| | | |
|---|---|---|
| 10,034,663 B1 | 7/2018 | Nason et al. |
| 10,092,288 B2 | 10/2018 | Denham et al. |
| 2004/0093031 A1 | 5/2004 | Burkhart et al. |
| 2013/0253581 A1* | 9/2013 | Robison ............. A61B 17/0401 606/232 |
| 2022/0338857 A1* | 10/2022 | Gabriel ............. A61B 17/0401 |

* cited by examiner

KNOTLESS BONE ANCHOR SYSTEM AND METHOD

CLAIM OF PRIORITY

This application claims the benefit of U.S. Provisional Patent Application Ser. No. 63/313,565, filed on Feb. 24, 2022, the benefit of priority of which is claimed hereby, and which is incorporated by reference herein in its entirety.

TECHNICAL FIELD

In general, but not by way of limitation, the present disclosure relates to devices and methods for coupling a anatomic structure to a second anatomic structure, such as coupling soft tissue to bone. More specifically, but not by way of limitation, the present disclosure relates to devices and methods that can be used in rotator cuff repairs.

BACKGROUND

Arthroscopic procedures often include sutures and anchors to secure soft tissue to bone. In examples, rotator cuff repairs can include attaching a soft tissue graft to shoulder muscles, e.g., the rotator cuff, at a first end and a humerus bone at a second end. Attachment of the soft tissue graft to the bone can involve the use of sutures that are attached to the soft tissue graft at a first end and a bone fastener, or anchor, at a second end. In other examples, the sutures can be attached directly to the shoulder muscles at the first end without the use of a tissue graft.

The implantation of sutures with anchors can be difficult. For example, tying knots in sutures can be very time consuming and difficult to perform, particularly inside the joint space. As a result, the cost of the procedure can be increased, and the capacity of the surgeon can be limited. Furthermore, the strength of the repair can be limited by the strength of the knot. Particular to rotator cuff repair, it is desirable to avoid tissue strangulation at the first and to ensure the attachment of the sutures to the anchor at the second end.

U.S. Pat. No. 10,034,663 to Nason et al. is titled "Devices and Methods for Knotless Material Fixation."

U.S. Pat. No. 6,544,281 to ElAttrache et al. is titled "Graft Fixation Using a Screw or Plug Against Suture or Tissue."

Overview

The present inventors have recognized, among other things, that problems to be solved with suture fixation to bone is the tendency for sutures being held in place with a bone fastener to ride up the bone fastener either during implantation or post-operatively over time as the joint to which the sutures are attached is flexed. For example, in some procedures, the sutures are positioned within a bore in the bone and then the bone fastener is threaded into the bore. However, it can be difficult to maintain a good frictional fixation of the sutures between the bone and the bone fastener due to, for example, movement between the bone fastener and the sutures during the procedure and pulling on the sutures by muscle after the procedure.

The subject matter of the present disclosure can provide a solution to these and other problems, such as by providing a knotless suture fixation device that can hold sutures in frictional engagement between the graft fixation anchor and adjacent bone or tissue on opposing sides of the knotless suture fixation device. In particular, the knotless suture fixation devices, e.g., knotless anchors or knotless bone fasteners, of the present disclosure can ensure that suture material is positioned along the full length of the bone anchor by tightly positioning the sutures to a distal tip of the knotless suture fixation device. The knotless suture fixation devices of the present disclosure additionally allow the surgeon to control tension in the sutures at a desired level when the knotless suture fixation devices are finally seated into the bone.

In an example, a method of soft tissue repair can comprise attaching at least one suture to a soft tissue to be affixed to a bone structure, positioning a tissue anchor on a driver, positioning a cinching suture alongside the driver, engaging a catch of the cinching suture with a stop of the driver, capturing the at least one suture attached to the soft tissue in a loop of the cinching suture positioned proximate a distal tip of the driver, drawing the at least one suture toward the distal tip of the driver by pulling at least a first portion of the cinching suture; preventing the cinching suture from passing by the driver by engaging the catch with the stop, and installing the tissue anchor into the bone structure to secure the at least one suture in the bone structure by interference-friction fixation between the tissue anchor and the bone structure.

In an additional example, a system for implanting soft tissue sutures into bone can comprise a knotless anchor, a driver and a cinching suture. The knotless anchor can comprise a fastener body and a cannulation extending through the fastener body. The driver can comprise a cannulated shaft, a tip extending from the cannulated shaft that is configured to extend into the cannulation rotate the knotless anchor, a lumen extending through the cannulated shaft and the tip and a radially extending surface in the lumen. The cinching suture can comprise a first proximal end portion, a second proximal end portion, a distal loop connecting the first proximal end portion and the second proximal end portion and a catch connected to at least one of the first proximal end portion and the second proximal end portion to engage the radially extending surface in the lumen.

DETAILED DESCRIPTION

Figure 1:
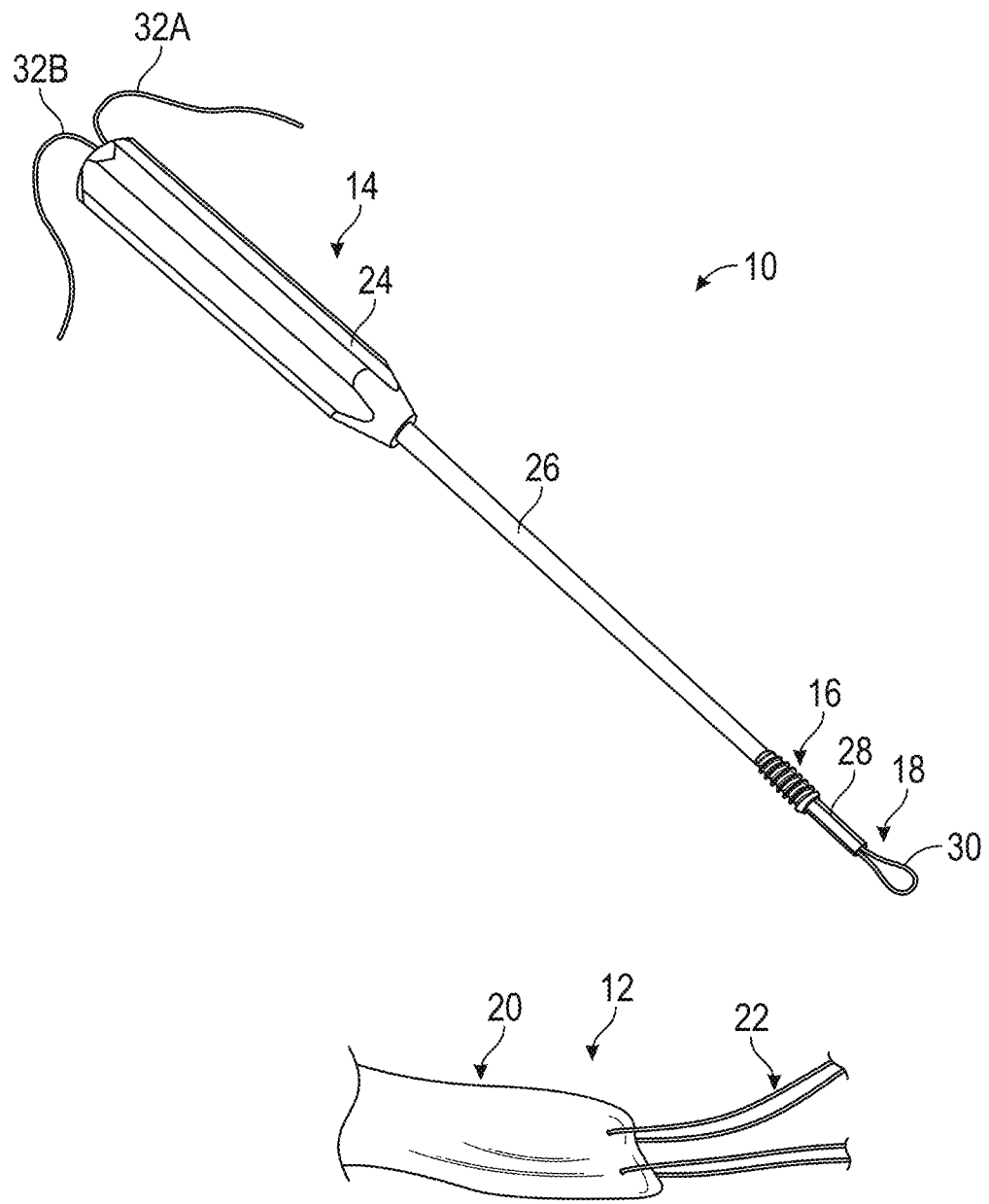
FIG. 1 is an assembled view of a knotless anchor system suitable for use in a soft tissue anchoring procedure, the knotless anchor system comprising a cannulated driver, a cannulated graft fixation anchor, a soft tissue specimen and associated sutures, and a cinching suture.

FIG. 1 is an assembled view of knotless anchor system 10 suitable for use with soft tissue specimen 12. Knotless anchor system 10 can comprise driver 14, anchor 16 and cinching suture 18. Soft tissue specimen 12 can comprise soft tissue material 20 and tissue sutures 22. The present application discusses the use of knotless anchor system 10 with a shoulder joint reconstruction, such as a rotator cuff reattachment, but can be applied to any procedure joining soft tissue to a bone structure. As such, humeral bone HB is shown in the drawings in FIG. 9D, but the present application can be used with other bones such as the femur, tibia, ulna and others.

Driver 14 can comprise handle 24, shaft 26 and tip 28. Handle 24, shaft 26 and tip 28 can be cannulated to allow cinching suture 18 to pass therethrough. Cinching suture 18 can comprise distal loop 30 and proximal end portions 32A and 32B.

Medial ends of tissue sutures 22 can be attached to tissue material 20 via any suitable means, such as pretied knots or loops. Tissue material 20 can comprise biological or synthetic material. In examples, tissue material 20 can comprise a soft tissue graft to be implanted in a patient. In additional examples, the medial ends of tissue sutures 22 can be attached directly to soft tissue. Lateral ends of tissue sutures 22 can be inserted into distal loop 30 to secure tissue sutures 22 to anchor 16. Tissue sutures 22 can comprise one or more strands of biocompatible material and can comprise plaited, braided, woven or monolithic materials. Medial and lateral ends of tissue sutures 22 can be attached in the opposite manner in other procedures.

Proximal end portions 32A and 32B can be operated to pull tissue sutures 22 into close proximity of the distal-most end of tip 28. Driver 14 can be used to position anchor 16 against bone. Tissue sutures 22 can extend along anchor 16 as anchor 16 is driven into the bone by driver 14. Proximal end portions 32A and 32B can be easily operated by a surgeon to maintain tissue sutures 22 in a desired state of proximity to anchor 16 or a desired state of tension relative to tissue material 20 during the implantation procedure. As such, sutures 22 can be maintained in frictional engagement with anchor 16 and the bone structure during implantation and during the life of the implant, thereby avoiding slippage of sutures 22 from the implantation site. Anchor 16 can be considered a knotless anchor because tying of a knot during the implantation procedure is not required to fix tissue sutures 22 in place at anchor 16. However, a pre-tied knot in cinching suture 18 can be tightened without the surgeon having to form the knot, as discussed below. In examples, tissue sutures 22 can be pre-knotted into engagement with tissue material 20.

Figure 2:
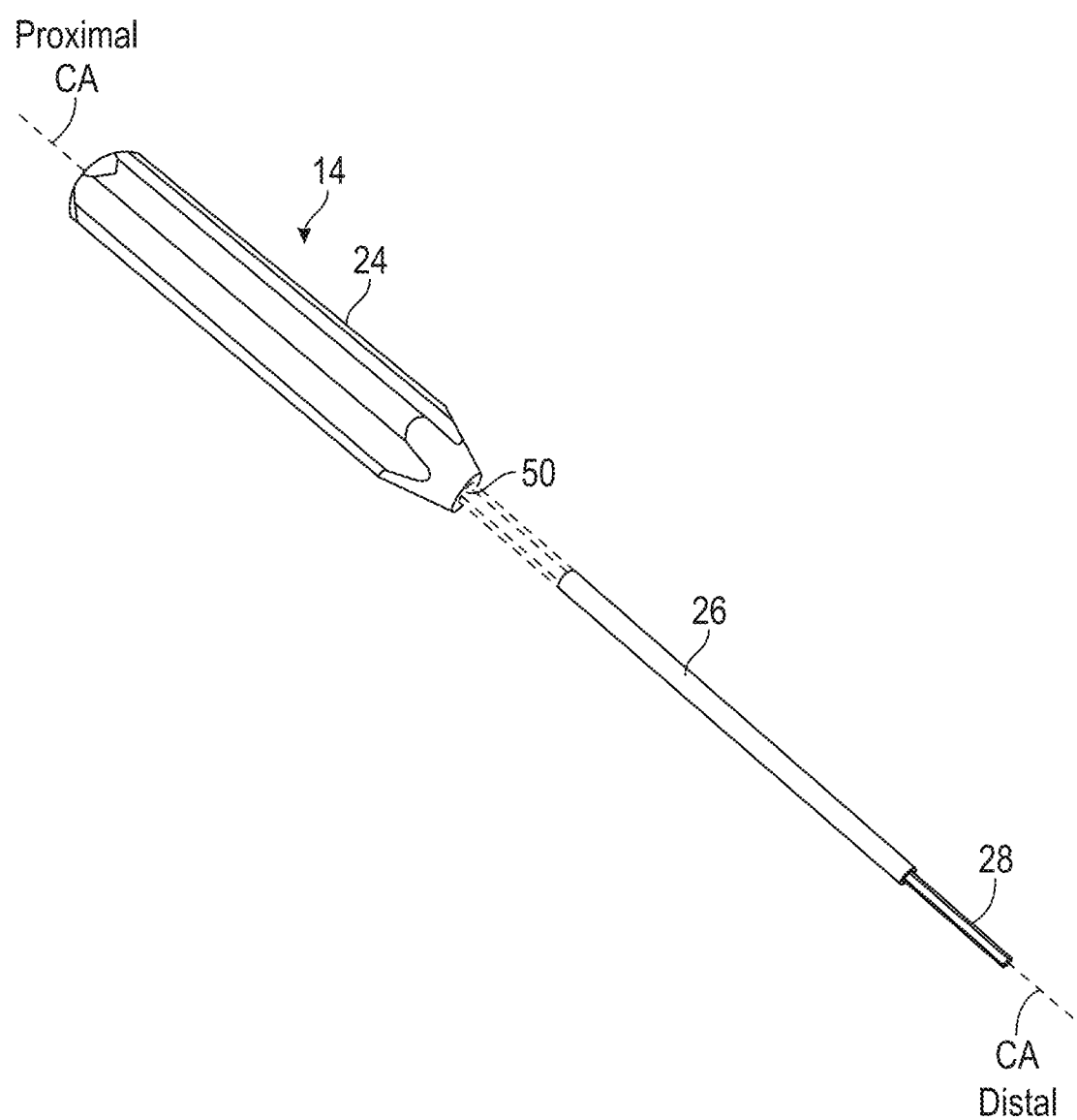
FIG. 2 is a perspective view of the cannulated driver of FIG. 1 showing a cannulation extending through a shaft of the driver.

FIG. 2 is a perspective view of driver 14. Tip 28 can comprise a distal extension of shaft 26. Handle 24 can be attached to a proximal end portion of shaft 26 in a fixed manner such that rotation of handle 24 can cause rotation of shaft 26 along central axis CA of driver 14. Alternatively, shaft 26 can extend through a portion of or the entirety of handle 24. In another example, tip 28 can comprise a portion of a separate elongate shaft extended through shaft 26 such that shaft 26 and the shaft of tip 28 are arranged in a coaxial relationship. In such a configuration, handle 24 can be attached to the proximal end of the shaft of tip 28 in a fixed manner such that rotation of handle 24 can cause rotation of shaft 28 along CA of driver 14, while shaft 26 does not rotate. Shaft 26 and tip 28 can be fabricated from material suitable for transmitting torque and resisting bending such as stainless steel. Handle 24 can be made of a plastic or polymer. Handle 24 can include features to facilitate gripping and rotation of handle 24 to facilitate implanting anchor 16 into bone structure by a surgeon. For example, tip 28 can be inserted into anchor 16 such that rotation of handle 24 can cause rotation of anchor 16.

Shaft 26 can have a circular cross-sectional profile and tip 28 can have a cross-sectional profile configured to transmit torque from shaft 26 to anchor 16. For example, tip 28 can have a hexagonal profile. A ledge or shoulder can be provided between shaft 26 and tip 28 to prevent anchor 16 from riding up proximally onto shaft 26. A portion of shaft 26 is illustrated in phantom to show cannulation 50. Cannulation 50 can extend continuously through shaft 26 and tip 28. In examples, shaft 26 can extend to the proximal end of handle 24 such that cannulation 50 can be accessed at the proximal end of handle 24 or via a bore extending into the proximal end of handle 24 to reach the proximal end of shaft 26 and cannulation 50.

As discussed below, cannulation 50, e.g., an internal passage or lumen, can extend all the way from the proximal end of handle 24 to the distal end of tip 28. As such, cinching suture 18 can extend from handle 24 to tip 28, as shown in FIG. 1. A surgeon can manipulate loop 30 at distal tip 28 by manipulating proximal end portions 32A and 32B from handle 24.

Figure 4:
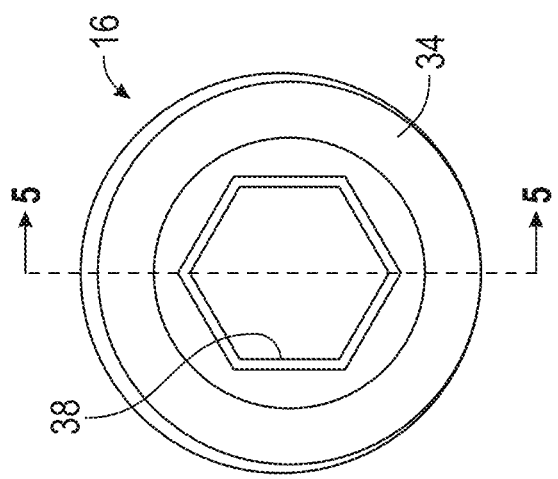
FIG. 4 is a top view of the cannulated graft fixation anchor of FIG. 3 showing a driver cannulation.
Figure 5:
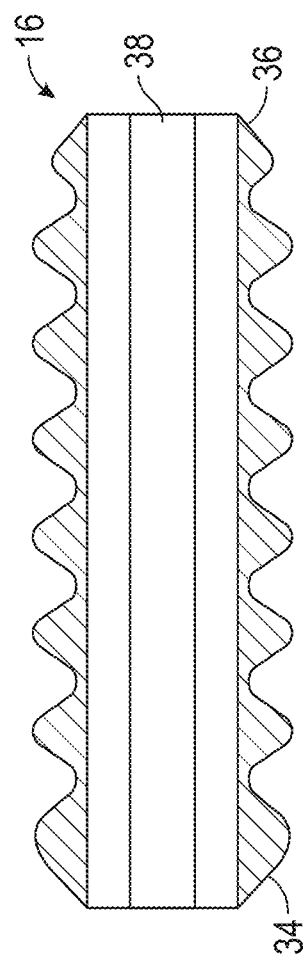
FIG. 5 is a cross-sectional view of the cannulated graft fixation anchor taken at section 5-5 of FIG. 4 to show the driver cannulation.
Figure 3:
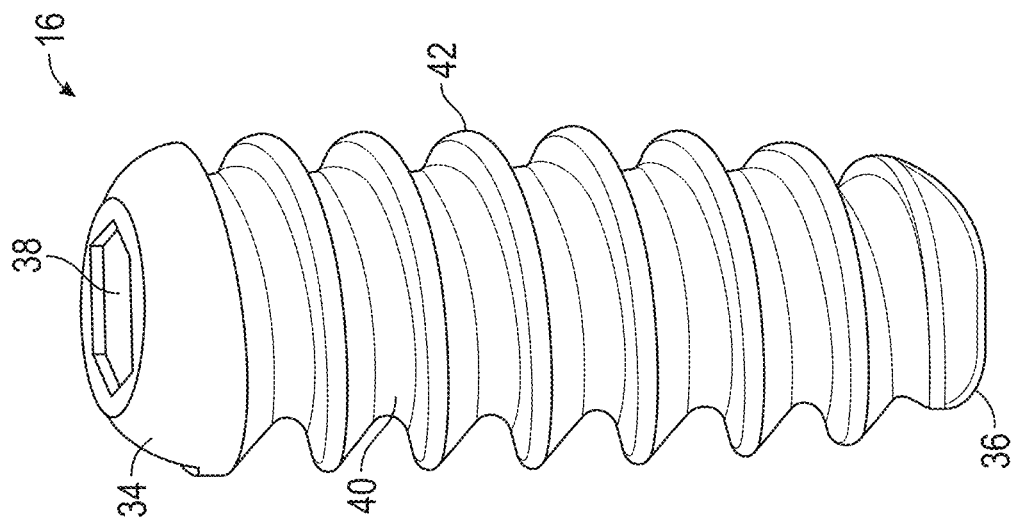
FIG. 3 is a perspective view of the cannulated graft fixation anchor of FIG. 1.

FIG. 3 is a perspective view of anchor 16. Anchor 16 can comprise proximal end 34, distal end 36, cannulation 38, exterior surface 40 and thread 42. FIG. 4 is a top view of anchor 16 of FIG. 3 showing cannulation 38. FIG. 5 is a cross-sectional view of anchor 16 of FIGS. 3 and 3 showing cannulation 38. FIGS. 3-5 are discussed concurrently. FIGS. 3-5 illustrate an example of a threaded anchor. However, the knotless anchor system of the present disclosure can additionally be used with other types of anchors, such as those not including external threading including pound-in anchors, interference plugs and nails.

Figure 10:
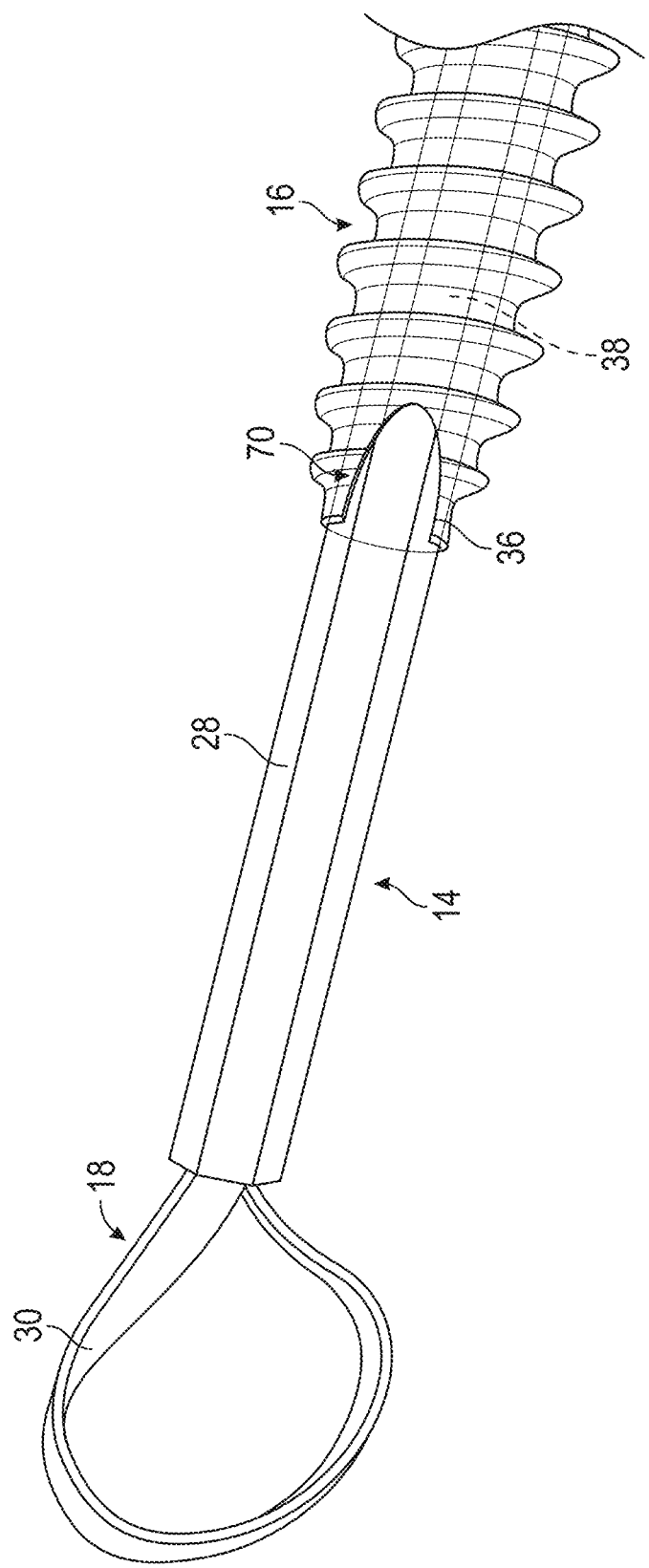
FIG. 10 is a schematic illustration of the tip of the cannulated driver inserted into the cannulated fastener, wherein the cannulated fastener includes distal notches for receiving graft sutures.

Anchor 16 can be formed of a biocomposite or bioabsorbable material such as Poly-L lactic acid (PLLA). In additional examples, anchor 16 can be fabricated of polymer, plastic, metal and trabecular metal. Anchor 16 can form a generally cylindrical body. Exterior surface 40 can be tapered from proximal end 34 to distal end 36 to, for example, facilitate driving into a bone structure. Cannulation 38 can extend from proximal end 34 to distal end 36 to extend all the way along the length of anchor 16. Cannulation 38 can have a cross-sectional profile configured to mate with driver 14 (FIG. 2). In examples, cannulation 38 can have a hexagonal cross-sectional profile to mate with tip 28. Tip 28 can extend through cannulation 38 to protrude therefrom, as shown in FIG. 1. Thus, the length of tip 28 can be greater than the length of anchor 16. Torque applied to handle 24 can be transmitted through shaft 26 and tip 28 to anchor 16 via engagement of the hexagonal outside shape of tip 28 with the hexagonal inner shape of cannulation 50. Thus, driver 14 can be used to rotate anchor 16, thereby pushing tissue sutures 22 along into a bone structure via loop 30. As discussed in greater detail below, it can be desirable to prevent tissue sutures 22 (FIG. 1) from riding up out of engagement with anchor 16 to prevent tissue sutures 22 from dislodging from the implantation site or loosening of the repaired joint. Thus, as shown in FIG. 10, distal end 36 of anchor 16 can be provided with notches 70 (FIG. 10) to facilitate holding of tissue sutures 22 at the distal tip of anchor 16, in addition to loop 30 of cinching suture 18 holding tissue sutures 22, to prevent retreating of tissue sutures 22 out of a bone bore into which anchor 16 is implanted.

Figure 6A:
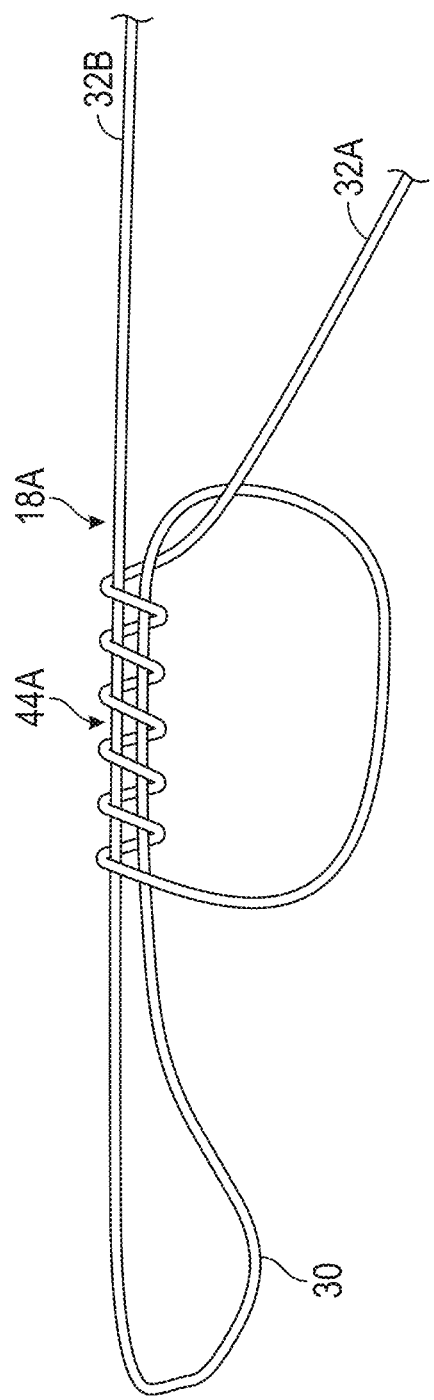
FIG. 6A is a plan view of a first example of the cinching suture of FIG. 1 including a sliding knot.

FIG. 6A is a plan view of a first example of a cinching suture comprising cinching suture 18A. Cinching suture 18A can comprise a single strand of material that extends through shaft 26 twice to form distal loop 30. Additionally, in other examples, cinching suture 18A can be extended through a shaft comprising distal tip 28 in examples where shaft 26 comprises a separate tube surrounding a shaft comprising distal tip 28. In examples, cinching suture 18A can be strung or positioned along the exterior of shaft 26, as discussed below. Thus, first proximal end portion 32A and second proximal end portion 32B can each extend into handle 24, through shaft 26 and through tip 28, with loop 30 connecting end portions 32A and 32B outside of driver 14. Cinching suture 18A can be fabricated from any suitable material, such as biocompatible materials, whether plaited, braided, woven or monolithic. Cinching suture 18A can be fabricated from the same or similar material as tissue sutures 22.

Cinching suture 18A can include knot 44A. As discussed in detail with reference to FIG. 8A, knot 44A can form an anchor, stop or catch that can prevent cinching suture 18 from passing through driver 14. In particular, knot 44A can form a protrusion that prevents cinching suture 18A from passing through cannulation 50. Knot 44A can allow one of proximal end portions 32A and 32B to be pulled to draw distal loop 30 toward tip 28. In the illustrated example of FIG. 6A, knot 44A can link first proximal end portion 32A and second proximal end portion 32B. In examples, distal loop 30 can comprise a Duncan loop, Nicky's knot, Tennessee slider, Roeder knot, SMC knot, Weston knot and the like. Thus, second proximal end portion 32B can be pulled by a surgeon at handle 24 (FIG. 2) to cinch, e.g., reduce the size of, or close loop 30 while shoulder 54 of counterbore 52 (FIG. 8A) pushes against the proximal side (right side in FIG. 6A) of knot 44A to allow knot 44A to be tightened.

Figure 6B:
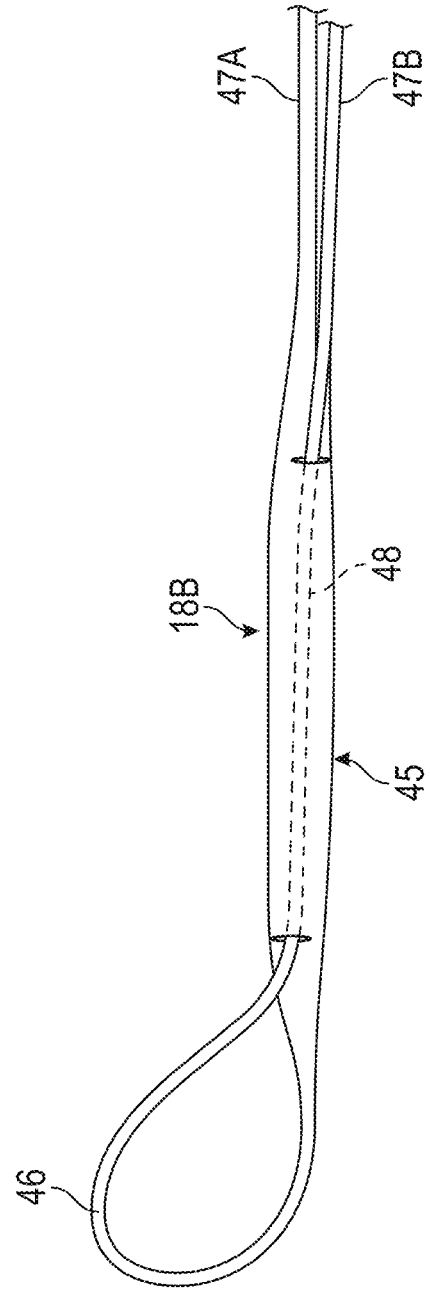
FIG. 6B is a plan view of a second example of the cinching suture of FIG. 1 including a zip-loop saddle.
Figure 8A:
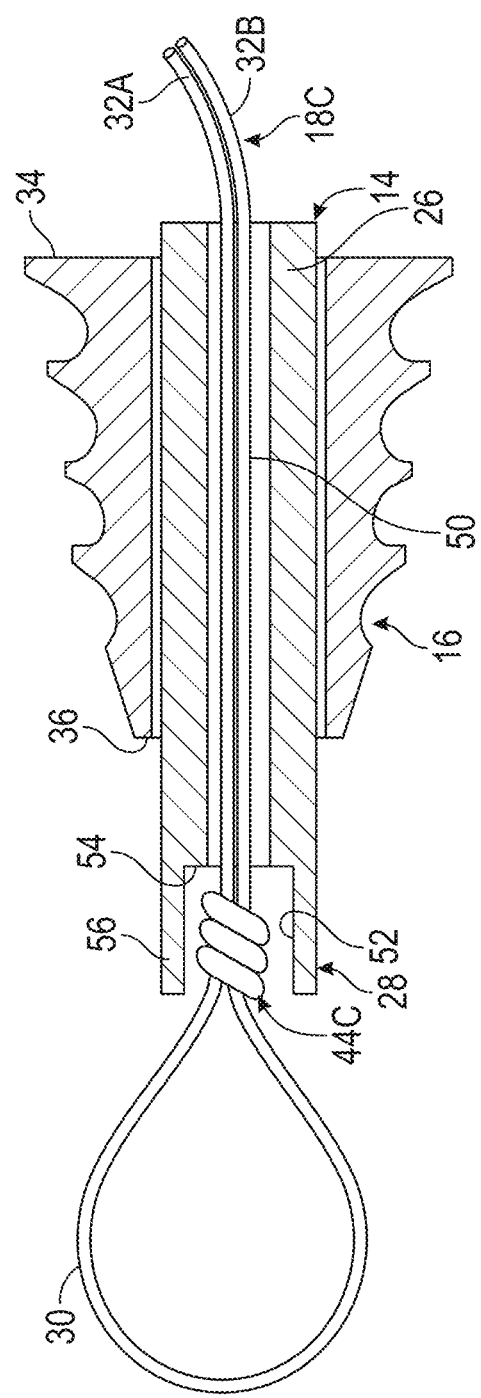
FIG. 8A is a cross-sectional view of the cannulated graft fixation anchor with the distal tip of the cannulated driver inserted therein and the cinching suture further inserted therein.
Figure 11:
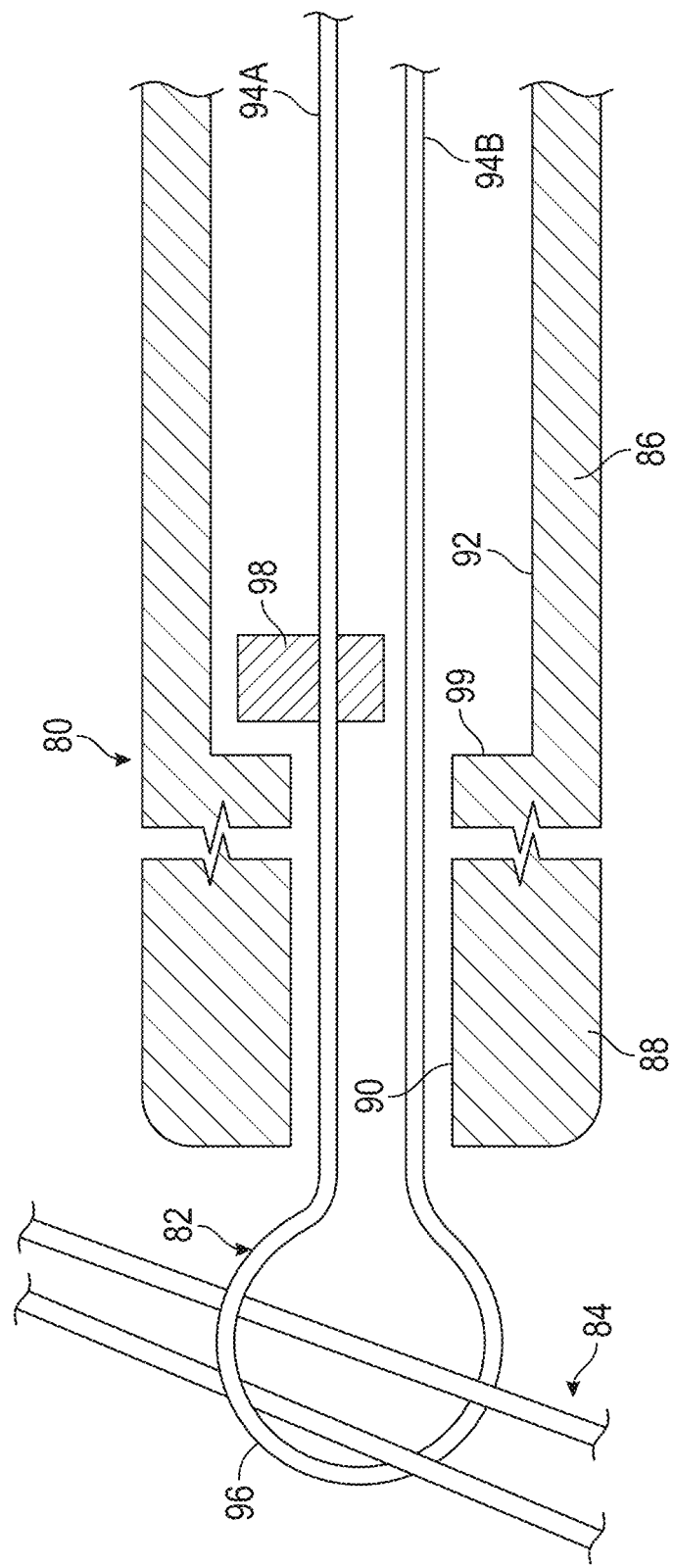
FIG. 11 is a cross-sectional view of a distal end portion of a tip of a cannulated driver having a proximally-facing shoulder and a cinching suture having a stop engageable with the proximally-facing shoulder.

Different types of knots can be used as knot 44A. For example, other slip knots can be used. In additional examples, the knot of the cinching suture can be a fixed knot where the distal loop has a fixed size, as shown in FIG. 8A. In additional examples, the knot of the cinching suture can be in one of end portions 32A and 32B such that end portions 32A and 32B are not cross-linked. In such examples, the knot can be replaced with other anchoring means, such as a bead or clamp, as shown in FIG. 11. In additional examples, the knot of the cinching suture can be replaced with a sliding joint or slip joint, as shown in FIG. 6B. In additional examples, knot 44A can be supplemented with devices to increase the size or anchoring capabilities of the knot, as discussed with reference to FIGS. 8B and 8C.

FIG. 6B is a plan view of a second example of a cinching suture comprising cinching suture 18B. Cinching suture 18B can comprise saddle 45, loop 46, first end portion 47A and second end portion 47B. Saddle 45 can comprise passage 48. Saddle 45 can function as a zip lock or zip-loop mechanism to allow loop 46 to be tightened without the presence of a knot.

Saddle 45 can comprise a sleeve attached to first end portion 47A. In examples, saddle 45 can comprise a braided body. The sleeve can form passage 48 into which second end portion 47B can be inserted. Thus, second end portion 47B can be pulled to close or cinch loop 46. Additionally, second end portion 47B can be pushed to expand loop 46 if cinching suture 18B is fabricated from a sufficiently rigid material.

Saddle 45 can additionally function as an anchor, stop or catch for cinching suture 18B within cannulation 50, as is discussed with reference to FIG. 8A. Thus, saddle 45 can comprise a protrusion of first end portion 47A that prevents first end portion 47A from being pulled proximally through cannulation 50 by engaging shoulder 54 (FIG. 8A).

Further details regarding the construction of examples of cinching suture 18B can be found in U.S. Pat. No. 10,092,288 B2 to Denham et al., titled "Method and Apparatus for Coupling Soft Tissue to a Bone," the entire contents of which are incorporated herein by this reference. In examples, cinching suture 18B can incorporate ZIPLOOP® technology manufactured by ZIMMER BIOMET® of Warsaw, Ind.

Figure 7:
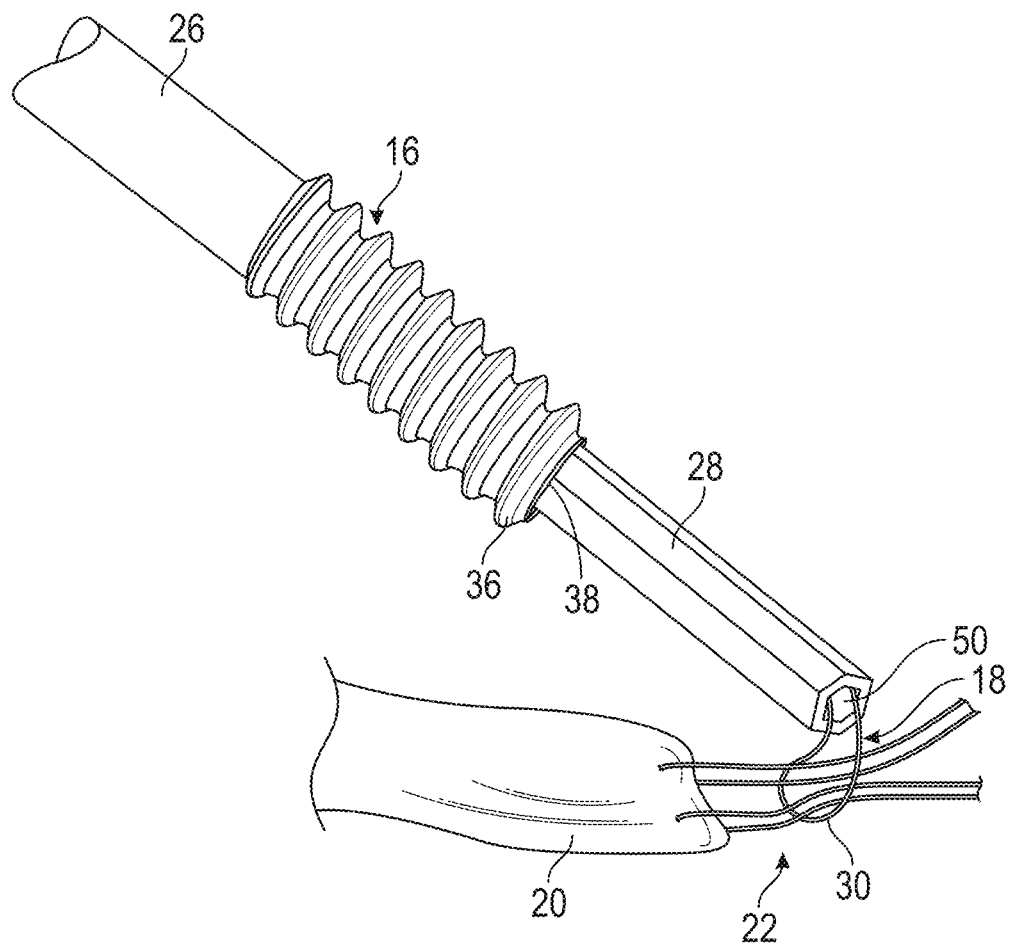
FIG. 7 is a perspective view of the cannulated graft fixation anchor disposed on a distal tip of the cannulated driver and the sutures of the soft tissue graft extending into a loop of the cinching suture.

FIG. 7 is a perspective view of cannulated graft fixation anchor 16 disposed on distal tip 28 of cannulated driver 14 and tissue sutures 22 of soft tissue specimen 12 extending into loop 30 of cinching suture 18. Proximal end portions 32A and 32B (FIG. 1) of cinching suture 18 attached to loop 30 can extend into cannulation 50 of distal tip 28. Tissue material 20 can be positioned further away from tip 28 that what is shown in FIG. 7 to allow lengths of tissue sutures 22 to extend along anchor 16 during implantation. As discussed herein, loop 30 can be cinched, drawn tight or collapsed around tissue sutures 22 to pull tissue sutures 22 into engagement with the distal end of tip 28 and, eventually, distal end 36 of anchor 16 as tip 28 is withdrawn from cannulation 38. As such, as anchor 16 is rotated into engagement with bone matter, tissue sutures 22 can extend flush along the length of anchor 16 during the implantation procedure, thereby increasing frictional engagement of tissue sutures 22 with bone matter and anchor 16.

FIG. 8A is cross-sectional view of cannulated graft fixation anchor 16 with distal tip 28 of cannulated driver 14 inserted therein and cinching suture 18C further inserted therein. Cinching suture 18C can comprise an example of cinching suture 18 of FIG. 1 and can comprise fixed knot 44C. Cinching suture 18C can further comprise loop 30, first end portion 32A and second end portion 32B. Cannulated graft fixation anchor 16 can comprise proximal end 34, distal end 36, cannulation 38, exterior surface 40 and thread 42. Driver 14 can comprise shaft 26, tip 28, cannulation 50 and counterbore 52.

Counterbore 52 can comprise an extension of cannulation 50 having a larger cross-sectional area. Thus, shoulder 54 can be located between cannulation 50 and counterbore 52. Shoulder 54 can extend in the radial direction relative to the central axis of shaft 26. Shoulder 54 can comprise a surface or ledge against which knot 44C, as well as knot 44A and saddle 45, can abut to provide resistance to axial movement of cinching suture 18. In the example of FIG. 8A, shoulder 54 can face distally. As shown in FIG. 11, however, counterbores of the present disclosure can face proximally.

Knot 44C can be located in counterbore 52. Knot 44C can be completely located within counterbore 52 such that loop 30 is the only portion of cinching suture 18 exposed at the distal end of driver 14, thereby allowing loop 30 to be positioned around tissue sutures 22 (FIG. 1). In the illustrated example, the length of sidewall 56 of tip 28 forming counterbore 52 is slightly longer than the length of knot 44C. For example, the length of sidewall 56, e.g., the length between the distal end of tip 28 and shoulder 54 can be in the range of approximately 2.0 millimeters to approximately 10.0 millimeters to receive knot 44C and other types of catches, though other lengths can be used. In additional examples, the length of sidewall 56 of tip 28 forming counterbore 52 can be longer than illustrated to allow for a length of loop 30 to be pulled into counterbore 52 along with knot 44C, thereby allowing size of loop 30 to be drawn down. For example, the length of sidewall 56, e.g., the length between the distal end of tip 28 and shoulder 54 can be in the range of approximately 10.0 millimeters to approximately 30.0 millimeters to receive the suture catch as well as a length of loop 30 in a collapsed state, though other lengths can be used. The longer the length of sidewall 56, more of loop 30 can be drawn into counterbore 52, thereby allowing loop 30 to be drawn to a smaller size and drawn tighter around tissue sutures 22.

Cinching suture 18 can be pulled proximally (to the right in FIG. 8A) at one or both of end portions 32A and 32B to prevent loop 30 from moving further away from tip 28 and to cinch or close loop 30. Knot 44C can engage with shoulder 54 to prevent loop 30 from being pulled through cannulation 50. As is described with reference to FIGS. 6A and 6B, one of end portions 32A and 32B can be pulled proximally at handle 24 to draw loop 30 through knot 44A or saddle 45, respectively, to decrease the size of loop 30.

In additional examples of the present disclosure, counterbore 52 can be omitted altogether and other stops can be used to arrest the movement of cinching suture 18C. For example, knot 44C can simply engage the end of a cannulated driver shaft that does not include a counterbore. Additionally, in examples, cinching suture 18C can be positioned outside of a driver shaft, whether cannulated or not cannulated. Thus, in examples, cinching suture 18C can be held in engagement with shaft 26 via other devices or means, such as being held in tension between a notch at the end of shaft 26 and handle 24. Additionally, other hooks or notches can be provided on the exterior of shaft 26 or tip 28 to hold cinching suture 18.

Figure 8B:
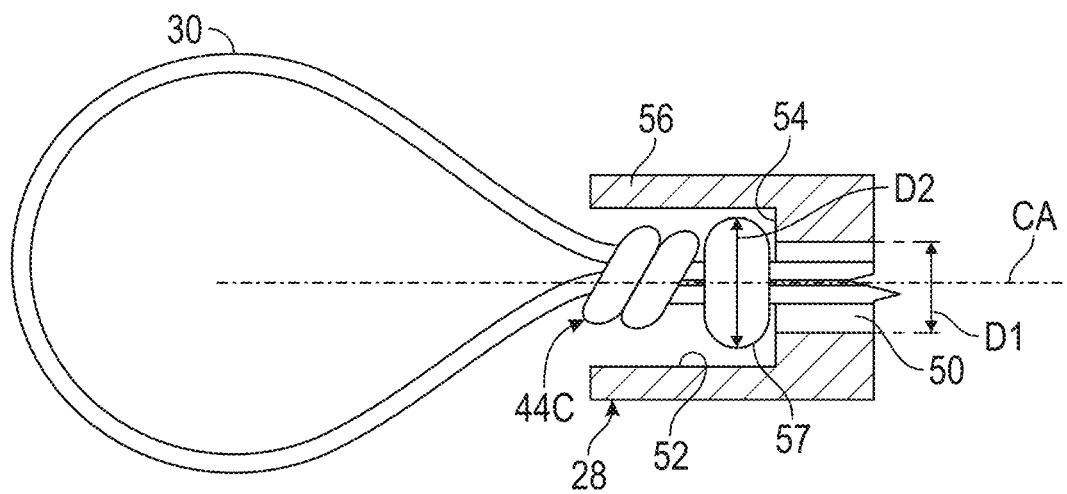
FIG. 8B is a cross-sectional view of the cannulated graft fixation anchor and the cannulated driver of FIG. 8A with the addition of an enlarger device positioned adjacent the knot of the cinching suture.

FIG. 8B is a cross-sectional view of cannulated graft fixation anchor 16 and cannulated driver 14 of FIG. 8A with the addition of enlarger device 57 positioned adjacent knot 44C of cinching suture 18C. Enlarger device 57 can comprise a body attachable to cinching suture 18C to prevent loop 30 from being pulled inside cannulation 50 of cannulated driver 14. Furthermore, enlarger device 57 can increase the size or footprint of knot 44C to increase the ability of knot 44C to attach to bone, such as by being tightly held within bone bore 60 (FIG. 9D). Enlarger device 57 can be attached to one or both strands of cinching suture 18C emanating from cannulation 50 so as to be immobilized relative thereto. In examples, enlarger device 57 can be positioned proximal of knot 44C. However, enlarger device 57 can be attached to cinching suture 18C in other locations. Enlarger device 57 can be larger than cannulation 50 to prevent enlarger device 57 from fitting inside cannulation 50. In examples, the minimum distance across any portion of enlarger device 57 can be larger than the diameter of cannulation 50. However, enlarger device 57 can be attached to cinching suture 18C in such a manner that even if enlarger device 57 were smaller than cannulation 50 in one dimension, enlarger device 57 can have at least one dimension that is oriented transverse to the axis of cannulation 50 to prevent enlarger device 57 from fitting within cannulation 50. In the illustrated example, cannulation 50 can have diameter D1 and enlarger device 57 can have a major axis with distance D2, with distance D2 being greater than diameter D1. Enlarger device 57 can be attached to cinching suture 18C so that the major axis is transverse to axis CA of shaft 26. In examples, distance D2 can be larger than the diameter of bone bore 60 (FIG. 9D). In examples, distance D2 can be smaller than diameter of bone bore 60. In examples, enlarger device 57 can be configured similarly to a sinker attached to a fishing line, such as a split shot sinker comprising a spherical body that is split along a portion of the circumference. As such, enlarger device 57 can be opened to allow strands of cinching suture 18C to fit into the body of enlarger device 57 and can then be closed into engagement of cinching suture 18C. In example, enlarger device 57 can comprise a deformable material that can be crimped onto cinching suture 18C. In examples, enlarging device 57 can be fabricated from a plastic or a metal material. In examples, enlarger device 57 can comprise a ball or block having a bore to receive cinching suture 18C and to which cinching suture 18C can be tied. In examples, enlarger device 57 can comprise a button, e.g., a plate with one or more holes therein. Enlarger device 57 can be bonded to cinching suture 18C, such as with a glue or adhesive, to prevent movement of enlarger device 57 relative to cinching suture 18C. In examples, enlarger device 57 can comprise two portions that are snap-fit together around cinching suture 18C. In examples, enlarger device 57 can be configured similarly as stop 98 of FIG. 11. As such, as one or both strands of cinching suture 18C are pulled proximally, enlarger device 57 inhibits loop 40 from being pulled into cannulation 50. Furthermore, enlarger device 57 can be implanted into bone matter along with cinching suture 18C, such as within bone bore 60 (FIG. 9D). Enlarger device 57 can occupy space within bone bore 60 along with tissue sutures 22 and cinching suture 18C, thereby tightening the fit of such components within bone bore 60 and inhibiting loosening of tissue sutures 22 from the bone.

Figure 8C:
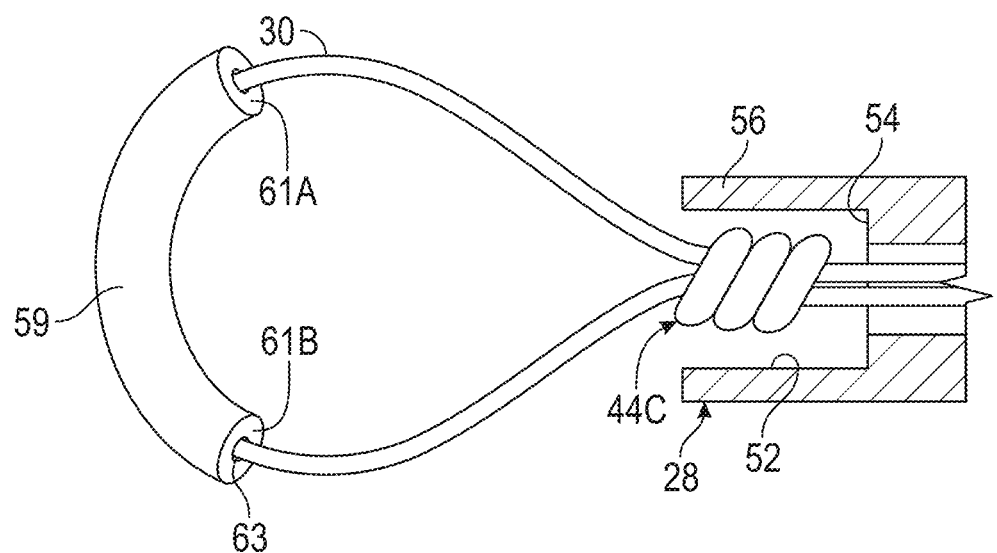
FIG. 8C is a cross-sectional view of the cannulated graft fixation anchor and the cannulated driver of FIG. 8A with the addition of a soft anchor positioned on the loop of the cinching suture.

FIG. 8C is a cross-sectional view of cannulated graft fixation anchor 16 and cannulated driver 14 of FIG. 8A with the addition of soft anchor 59 positioned on loop 30 of cinching suture 30. Soft anchor 59 may be a flexible anchor slideably positioned at any suitable position on cinching suture 18C. In particular, soft anchor 59 can be positioned on loop 30. Soft anchor 59 can comprise an elongate member having a sleeve or tubular configuration with first anchor end 61A and second anchor end 61B opposite first anchor end 61A. Internal passage 63 can be defined by a wall of soft anchor 59 and can extend between first anchor end 6A 1 and second anchor end 61B. In some examples, internal passage 63 can extend from first anchor end 61A to second anchor end 61B. In other examples, ends of internal passage 63 can extend from locations proximate to, but spaced apart from, first anchor end 61A and second anchor end 61B in the wall. Soft anchor 59 can be made of resorbable or non-resorbable materials, including braided suture, sponges and sponge-like materials in solid form, perforated materials, woven/braided from biocompatible materials or fibers, such as, for example, polymer, polyester, polyethylene, cotton, silk, or other natural or synthetic materials. Soft anchor 59 can have properties that allow soft anchor 59 to change shape. In this regard, soft anchor 59 can be, for example, compliant, flexible, foldable, squashable, squeezable, deformable, limp, flaccid, elastic, low-modulus, soft, spongy, or perforated, or have any other characteristic property that allows it to change shape. In some examples, soft anchor 59 can be coated with biological or biocompatible coatings and also can be soaked in platelets and other biologics, which can be easily absorbed by soft anchor 59. In examples, soft anchor 59 can be formed from a strand of No. 5 braided polyester suture. In other words, multiple fibers can be braided together to form a hollow-core braided suture having a longitudinal passage.

Soft anchor 59 can be assembled onto cinching suture before loop 30 and knot 44C are formed. In particular, as loop 30 is cinched around tissue sutures 22 (FIG. 7), soft anchor 59 can shorten in length between first anchor end 61A and second anchor end 61B. As the size of loop 30 decreases, material of soft anchor 59 can compresses such that soft anchor 59 deforms. As such, the size of soft anchor 59 can change from an elongate tubular body to a concentrated mass of material. Shortening or scrunching of soft anchor 59 can additionally remove or reduce further compressing or shrinking of soft anchor 59 such that soft anchor 59 can transform into a relatively harder anchor. Thus, soft anchor 59 can be implanted into bone matter along with cinching suture 18C, such as within bone bore 60 (FIG. 9D). Soft anchor 59 can occupy space within bone bore 60 along with tissue sutures 22 and cinching suture 18C, thereby tightening the fit of such components within bone bore 60 and inhibiting loosening of tissue sutures 22.

Figure 9A:
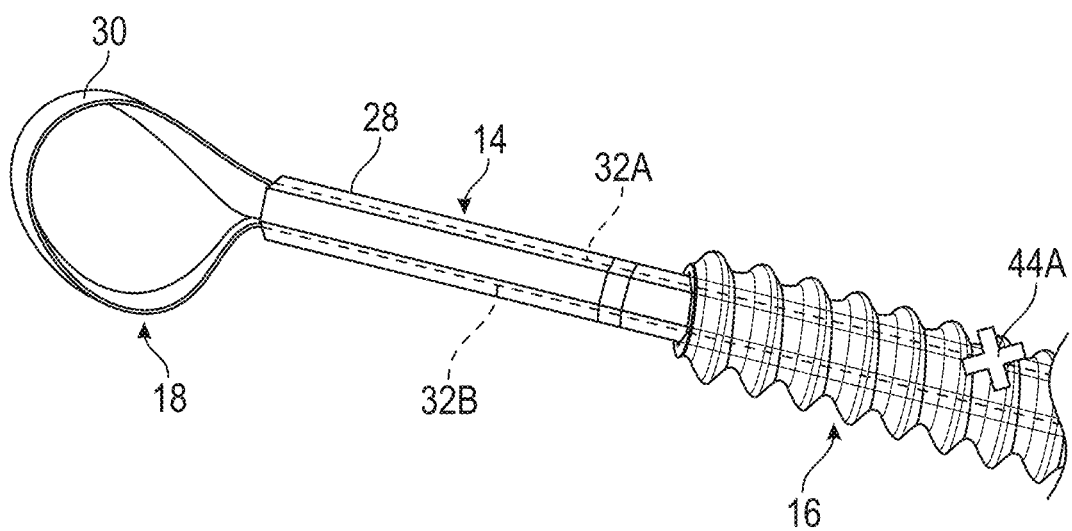
FIG. 9A is a diagrammatic view of a step of a procedure for implanting a knotless suture anchor of the present disclosure comprising assembling a cinching suture and a cannulated fastener with a cannulated driver.

FIG. 9A is a diagrammatic view of a step of a procedure for implanting knotless anchor 16 of the present disclosure comprising assembling cinching suture 18C with cannulated driver 14 and cannulated anchor 16. Knot 44A (FIG. 6A) can be made in end portions 32A and 32B to form loop 30. Knot 44A is diagrammatically shown in FIGS. 9A-9C as an X and end portions 32A and 32B are diagrammatically shown in FIGS. 9A-9C as dashed lines to represent the configuration of cinching suture 18C inside knotless anchor 16 and driver 14. Knot 44A and the associated X can be positioned anywhere along tip 28 and, as shown in FIG. 8A, can be positioned close to the distal end of tip 28. Proximal ends of portions 32A and 32B can be fed into distal end of tip 28 of driver 14 until proximal ends of portions 32A and 32B protrude from the proximal end of handle 24. Cinching suture 18 can be advanced proximally within cannulation 50 (FIG. 2) of driver 14 until knot 44A engages shoulder 54 (FIG. 8A). Loop 30 can remain exposed outside of the distal end of tip 28.

Cinching suture 18 can be pre-assembled with driver 14 before the surgical procedure. For example, cinching suture 18 and driver 14 can be preassembled by a technician or the manufacturer to avoid having to do so during the surgical procedure, thereby saving time and inconvenience during the procedure. Likewise, cannulated anchor 16 can be pre-assembled onto tip 28.

Figure 9B:
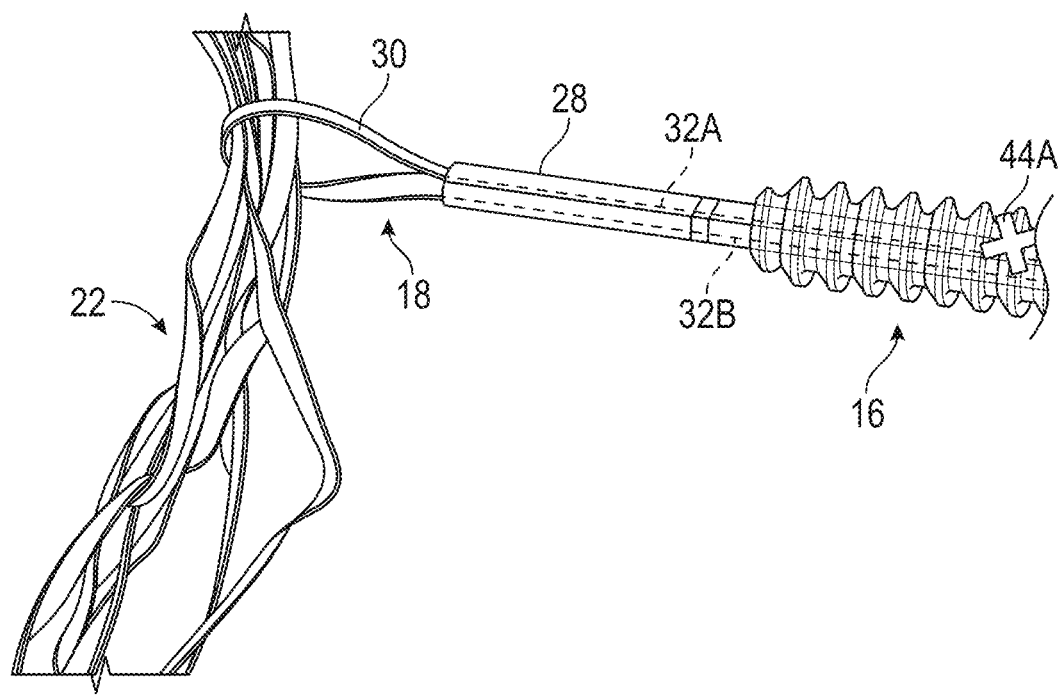
FIG. 9B is a diagrammatic view of a step of a procedure for implanting a knotless suture anchor of the present disclosure comprising inserting graft sutures into a loop of the cinching suture of FIG. 9A.

FIG. 9B is a diagrammatic view of a step of a procedure for implanting knotless anchor 16 of the present disclosure comprising inserting tissue sutures 22 into loop 30 of cinching suture 18 of FIG. 9A. The lateral ends of tissue sutures 22 can comprise free ends that are not attached to any other component. The free proximal ends of tissue sutures 22 can be inserted through loop 30 to be captured therein. Loop 30 can be maintained in a relaxed and open state such that tissue sutures 22 can be freely moved therein to allow the surgeon to adjust tissue sutures 22 to the desired tension later. However, even if loop 30 were drawn closed or to a semi-closed state, the position of tissue sutures 22 can be adjusted if needed or desired.

Figure 9C:
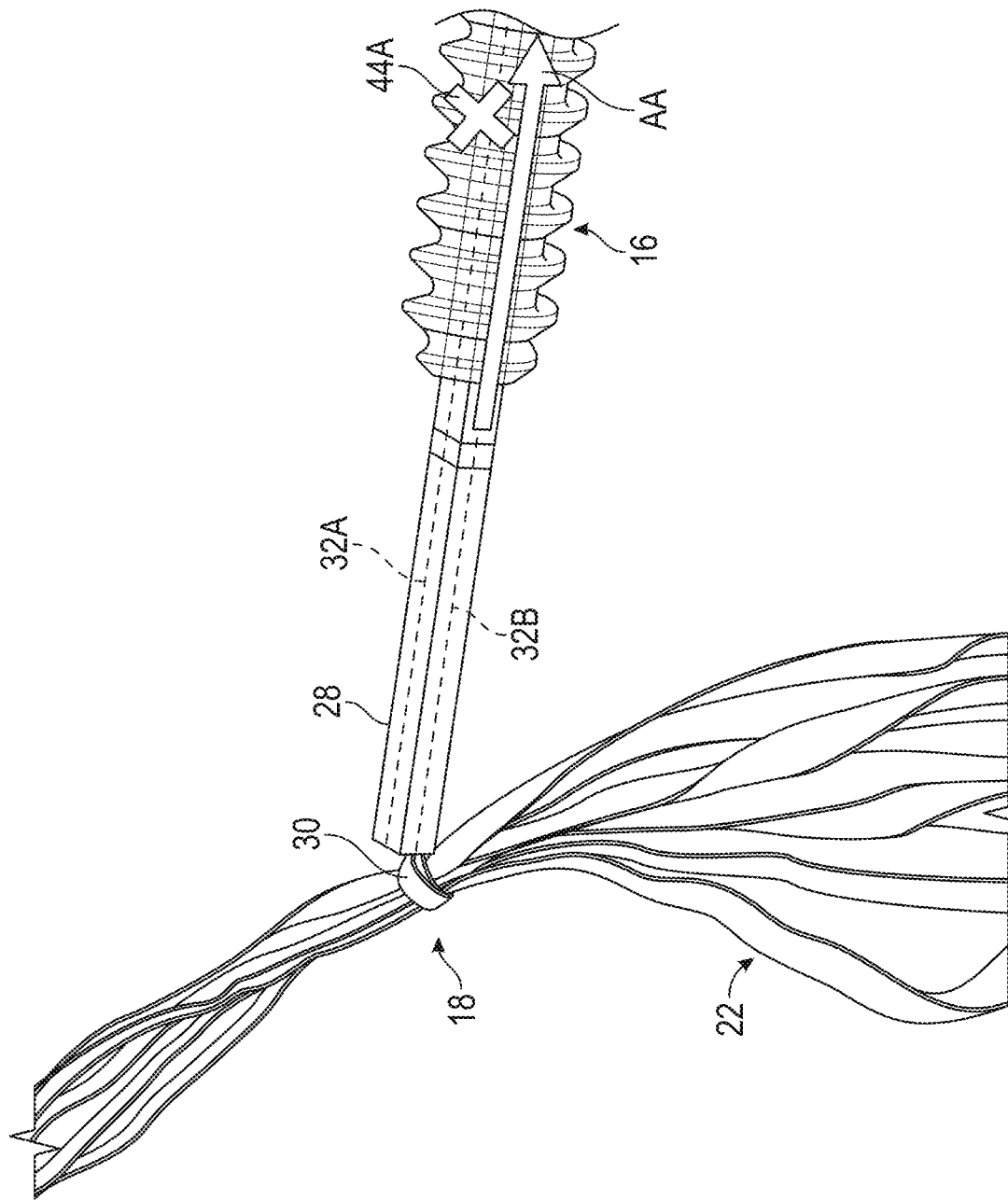
FIG. 9C is a diagrammatic view of a step of a procedure for implanting a knotless suture anchor of the present disclosure comprising drawing the cinching suture tight to position the graft sutures at a distal tip of the cannulated driver.
Figure 9D:
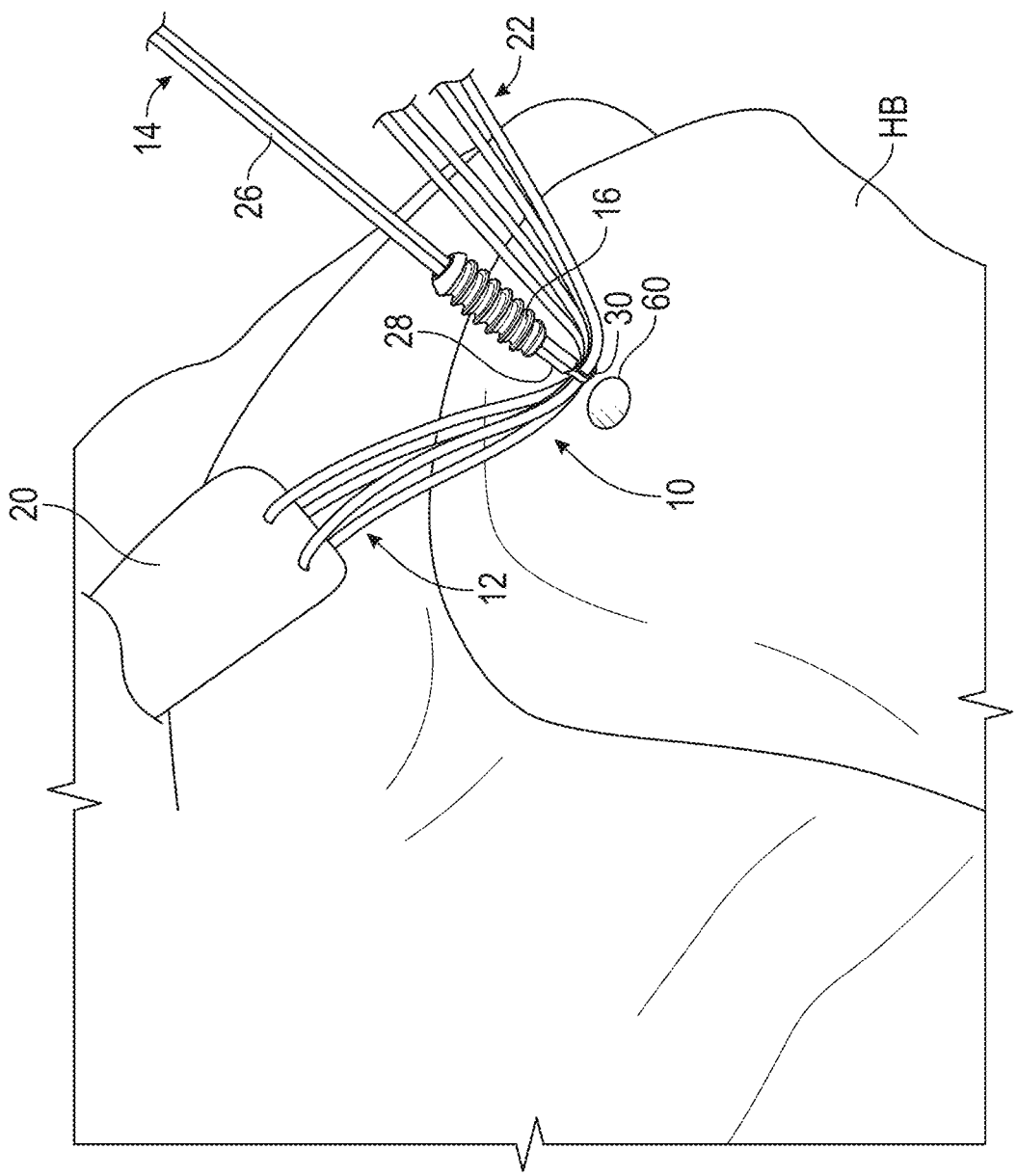
FIG. 9D is a diagrammatic view of a step of a procedure for implanting a knotless suture anchor of the present disclosure comprising positioning the knotless suture fixation system proximate a bone bore in a humeral bone.

FIG. 9C is a diagrammatic view of a step of a procedure for implanting knotless anchor 16 of the present disclosure comprising drawing cinching suture 18 tight to position tissue sutures 22 at the distal end of tip 28 of cannulated driver 14. With knot 44A of first proximal end portion 32A engaged with shoulder 54 (FIG. 8A), second end portion 32B can be pulled proximally as indicated by arrow AA to cinch loop 30 around tissue sutures 22. Pulling of second proximal end portion 32B can tighten knot 44A such that first proximal end portion 32A and second proximal end portion 32B are tightly bound together as loop 30 is tightly wound around tissue sutures 22. Thus, tissue sutures 22 can be slidably positioned at the distal end of tip 28 to minimize displacement therefrom as anchor 16 is threaded into bone matter. As discussed, engagement of a knot, stop, catch or anchor on cinching suture 18 with shoulder 54 (FIG. 8A) can prevent cinching suture 18 from being pulled through cannulation 50.

FIG. 9D is a diagrammatic view of a step of a procedure for implanting knotless suture anchor 16 of the present disclosure comprising positioning knotless fixation system 10 proximate bone bore 60 in a humeral bone HB. As mentioned above, knotless fixation system 10 can be used with other bones besides humeral bones. Bone bore 60 can be sized for receiving cannulated graft fixation anchor 16 of the present disclosure. Soft tissue specimen 12 can be attached to anchor 16 via cinching suture 18. Anchor 16 can be attached to tip 28 of driver 14. Driver 14 can be used to position anchor 16 proximate bone bore 60. Bone bore 60 can be drilled, reamed, punched or otherwise formed into humerus bone HB by a surgeon before knotless anchor system 10 is assembled, e.g., before soft tissue specimen 12 is assembled with cinching suture 18. Tip 28 of shaft 26 of driver 14 can be first inserted into bore 60, tissue sutures 22 can be tensioned and then driver 14 can be further advanced to engage anchor 16 with bone surrounding bore 60.

Figure 9E:
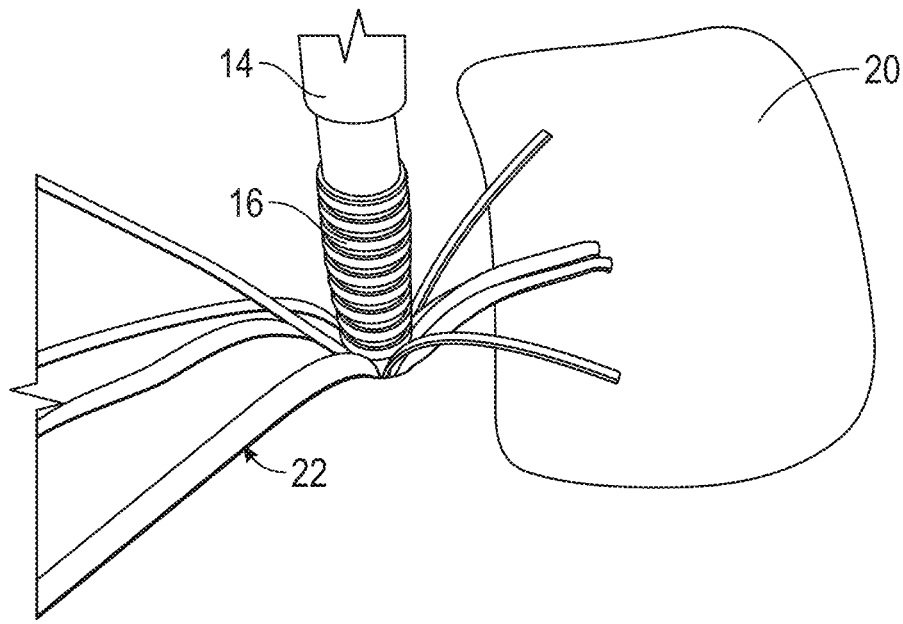
FIG. 9E is a diagrammatic view of a step of a procedure for implanting a knotless suture anchor of the present disclosure comprising positioning the distal tip of the cannulated fastener into the bore within the humeral bone.

FIG. 9E is a diagrammatic view of a step of a procedure for implanting knotless anchor 16 of the present disclosure comprising positioning the distal tip of cannulated graft fixation anchor 16 into bone bore 60 within humerus bone HB. As driver 14 is rotated, anchor 16 can likewise be rotated and slide distally along tip 28. However, tissue sutures 22 can be maintained generally stationary, e.g., not rotating, due to frictional engagement with bone bore 60, thereby also holding cinching suture 18 in a non-rotating manner. Tissue sutures 22 can be pushed into engagement with anchor 16 via bone surrounding bore 60. Tissue sutures 22 can be maintained between anchor 16 and the bone of bore 60 via cinching suture 18 maintaining engagement of tissue sutures 22 at the distal tip of anchor 16. Anchor 16 can rotate against tissue sutures 22 while being axially advanced into bone bore 60.

Figure 9F:
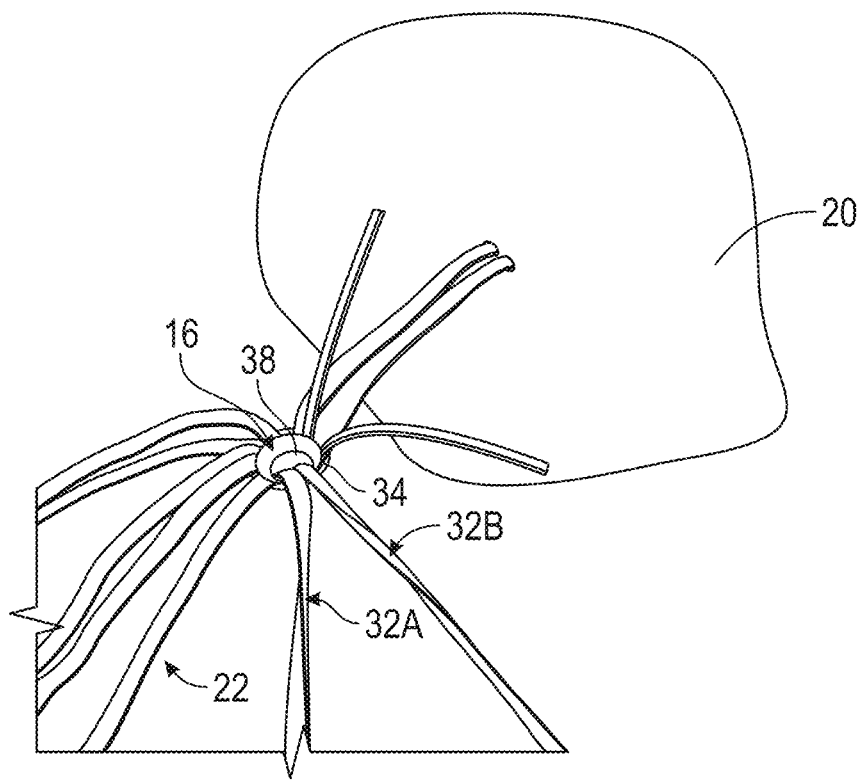
FIG. 9F is a diagrammatic view of a step of a procedure for implanting a knotless suture anchor of the present disclosure comprising driving the cannulated fastener the bone to frictionally secure the graft sutures.

FIG. 9F is a diagrammatic view of a step of a procedure for implanting knotless anchor 16 of the present disclosure comprising driving cannulated graft fixation anchor 16 into humerus bone HB to frictionally secure tissue sutures 22. Anchor 16 can be driven into bone bore 60 until proximal end 34 is flush or nearly flush with bone surface surrounding bone bore 60 to thereby install or implant anchor 16 within humerus bone HB. In additional examples, proximal end 34 can extend from bone surface of humerus bone HB. Medial ends of tissue sutures 22 can thereby be secured between anchor 16 and tissue material 20 as shown. Lateral ends of tissue sutures 22 and proximal end portions 32A and 32B can be trimmed as desired in close proximity to anchor 16. Proximal end portions 32A and 32B can additionally be knotted or tied off before trimming to further prevent movement of anchor suture 18. As mentioned, the procedure is described with medial ends of tissue sutures 22 being attached to tissue material 20, but this can be reversed in other examples. As such, tissue sutures 22 can have two lengths of material extend along anchor 16 to provide interference-friction fixation of tissue sutures 22 between anchor 16 and bone bore 60.

In summary, an example procedure can comprise: 1) produce a bone bore in a bone; 2) load tissue sutures through a cinching loop of a cinching suture; 3) cinch the loop so that the tissue sutures are slidably attached to distal end of driver via thing cinching loop; 4) insert a distal tip of the driver into the bottom of the bone bore to hold tissue sutures at bottom of bore during tensioning; 5) tension the tissue sutures to a desired tension, such as by pulling on the tissue sutures; and 6) insert the bone anchor into the bone bore to secure the tissue sutures via interference fixation.

FIG. 10 is a schematic illustration of tip 28 of cannulated driver 14 inserted into knotless anchor 16, wherein knotless anchor 16 includes distal notch 70 for receiving tissue sutures 22. Cannulated driver and cinching suture 18 can be configured similarly as described herein. Knotless anchor 16 be configured similarly as described herein with the addition of notch 70. Anchor 16 can include two distal notches 70 opposite each other at distal end 36, thereby allowing opposing portions of tissue sutures 22 to protrude therefrom. In examples, distal end 36 of anchor 16 can comprise more than two notches 70 thereby resulting in a plurality of teeth being formed at distal end 36. Thus, in examples, as anchor 16 is brought closer to tissue sutures 22 by sliding down tip 28, as can occur between what is shown in FIGS. 9D and 9F, notches 70 can engage tissue sutures 22 to prevent tissue sutures 22 from slipping off of the distal tip of anchor 16 and retreating from bone bore 60 due to flexion of the shoulder joint or other phenomena.

FIG. 11 is a cross-sectional view of cannulated driver 80, cinching suture 82 and graft sutures 84. Cannulated driver can comprise shaft 86, tip 88, cannulation 90 and counterbore 92. Cinching suture 82 can comprise first proximal end portion 94A, second proximal end portion 94B, loop 96 and stop 98. Cannulation 90 can have shoulder 99.

Cannulated driver 80 can be configured similarly as cannulated driver 14 except with the proximal portion of cannulation 90 be widened by counterbore 92, rather than the distal portion of cannulation 50 being widened by counterbore 52 (FIG. 8A). Shoulder 99 can form a radially extending surface that faces in the proximal direction, as compared to shoulder 54 (FIG. 8A) comprising a radially extending surface that faces in the distal direction. Shoulder 99 can be located anywhere along the length of shaft 86. In examples, shoulder 99 is located close to a proximal end of shaft 86 to allow access by a surgeon.

Shoulder 99 can form a ledge against which stop 98 can abut to provide resistance to axial movement of cinching suture 82. As such, pulling of second proximal end portion 94B in the proximal direction can cause loop 96 to close around graft sutures 84. First proximal end portion 94A can thereby be caused to move in the distal direction, but stop 98 will arrest the distal movement of first proximal end portion 94A allowing loop 96 to wrap tightly around graft sutures 84.

Stop 98 can comprise a device or body attached to first proximal end portion 94A that has a width larger than cannulation 90. Stop 98 can comprise a ball or block having a bore to receive first proximal end portion 94A. In examples, stop 98 can comprise a button, e.g., a plate with one or more holes therein. Stop 98 can be adhered to or snap fit onto first proximal end portion 94A to prevent movement of stop 98 relative to first proximal end portion 94A. In desirable examples, stop 98 can additionally or alternatively comprise a knot within first proximal end portion 94A that does not engage second proximal end portion 94B to immobilize stop 98.

Second proximal end portion 94B can be held in tension while the bone anchor used in conjunction with graft sutures 84 is implanted into bone. After the bone anchor used in conjunction with graft sutures 84 is implanted and graft sutures 84 are anchored in place, cinching suture 82 can be removed from the bone anchor by pulling first proximal end portion 94A.

Figure 12A:
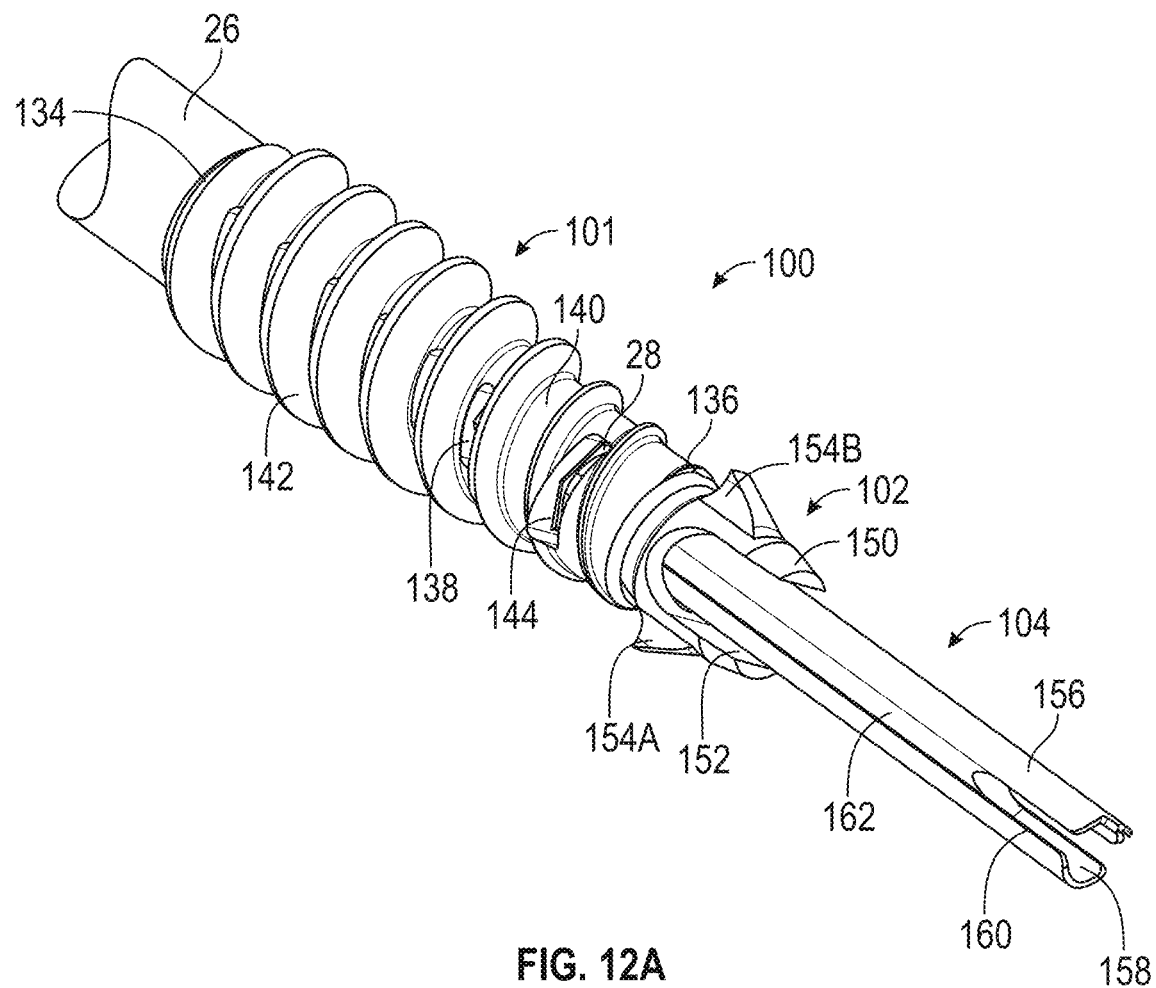
FIG. 12A is a schematic illustration of the tip of the cannulated driver inserted into another example of a cannulated fastener, wherein the cannulated fastener comprises a rotating wing tip attached to a fastener body.

FIG. 12A is a schematic illustration of tip 28 of cannulated driver 14 inserted into cannulated fastener 100, wherein cannulated fastener 100 comprises fastener body 101 and wing tip 102. Driver 14 can be used with tube 104 that can be inserted through shaft 26 of cannulated driver.

Cannulated fastener 100 can comprise fastener body 101 comprising proximal end 134, distal end 136, cannulation 138, exterior surface 140, thread 142 and windows 144. Wing tip 102 can comprise hub 150, cut-out 152, first wing 154A and second wing 154B. Tube 104 can comprise elongate body 156, cannulation 158, slot 160 and channel 162.

Fastener body 101 can be configured similarly to fastener 16 of FIG. 3 except for the inclusion of windows 144 that allow for viewing into cannulation 138. Furthermore, distal end 136 of fastener body 101 can be configured to rotatably engage with wing tip 102 rather than terminating at a tapered portion like distal end 36 of fastener 15.

Figure 12B:
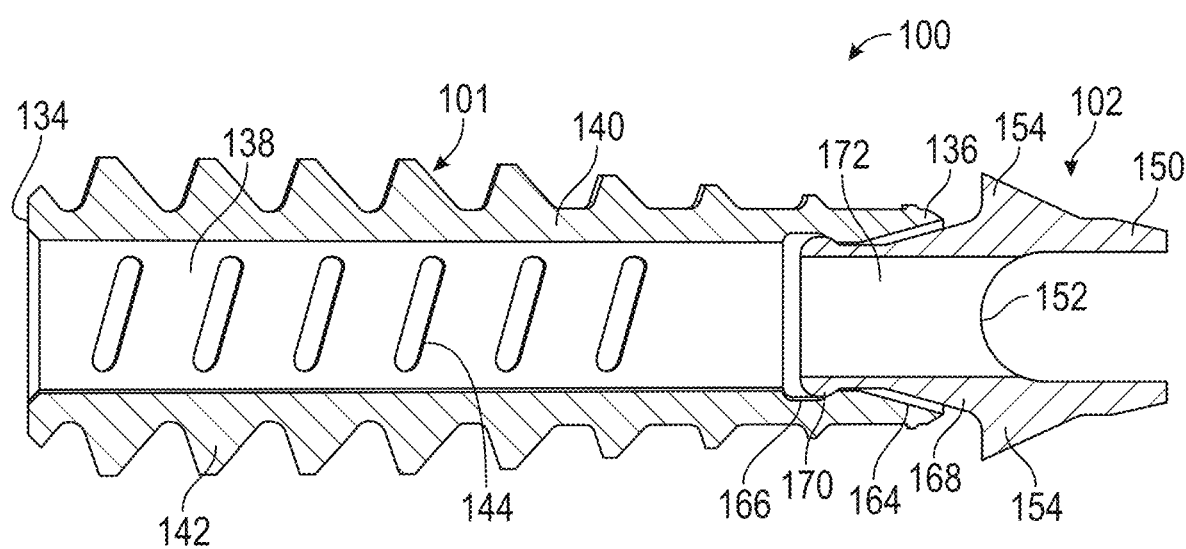
FIG. 12B is a side cross-sectional view of the cannulated fastener of FIG. 12A showing coupling of the rotating wing tip to the fastener body.

FIG. 12B is a cross-sectional view of cannulated fastener 100 of FIG. 12A showing coupling wing tip 102 to fastener body 101. Fastener body 101 can comprise distal socket 164 having channel 166. Wing tip 102 can comprise proximal extension 168, flange 170 and cannulation 172. Proximal extension 168 of wing tip 102 can be inserted into distal socket 164 of fastener body 101 so that flange 170 is positioned within channel 166. Proximal extension 168 and distal socket 164 can comprise revolved bodies (e.g., have uniform wall thicknesses) such that proximal extension 168 can freely rotate within distal socket 164 relative to the central axis of cannulated fastener 100. However, engagement of flange 170 with channel 166 can prevent or inhibit axial displacement of wing tip 102 relative to fastener body 101. As such, wing tip 102 can be implanted in bone matter, while fastener body 101 can be left to rotate relative to wing tip 102. For example, tip 28 of cannulated driver 14 can be inserted into cannulations 138 of fastener body 101. Cannulation 172 or wing tip 102 can be smaller than tip 28 to prevent tip 28 from being inserted into cannulation 172. Wings 154 can be pushed into bone matter surrounding bone bore 60 (FIG. 9D) at the surface of the bone using cannulated driver 14 to prevent rotation of wing tip 102. Tip 28 of cannulated driver 14 can be rotated to rotate fastener body 101 relative to wing tip 102 to allow threads 142 to engage with bone matter inside bone bore 60. As such, threads 142 can advance fastener body 101 along bone bore 60, pushing wing tip 102 further into bone bore 60. As discussed in greater detail below, cut-out 152 in wing tip 102 can be used to hold knot 44C at a radial position around bone bore 60 and to prevent knot 44C and cinching suture 18 from being pulled through cannulation 138 in fastener body 101 or twisted as fastener body 101 rotates.

Figure 12C:
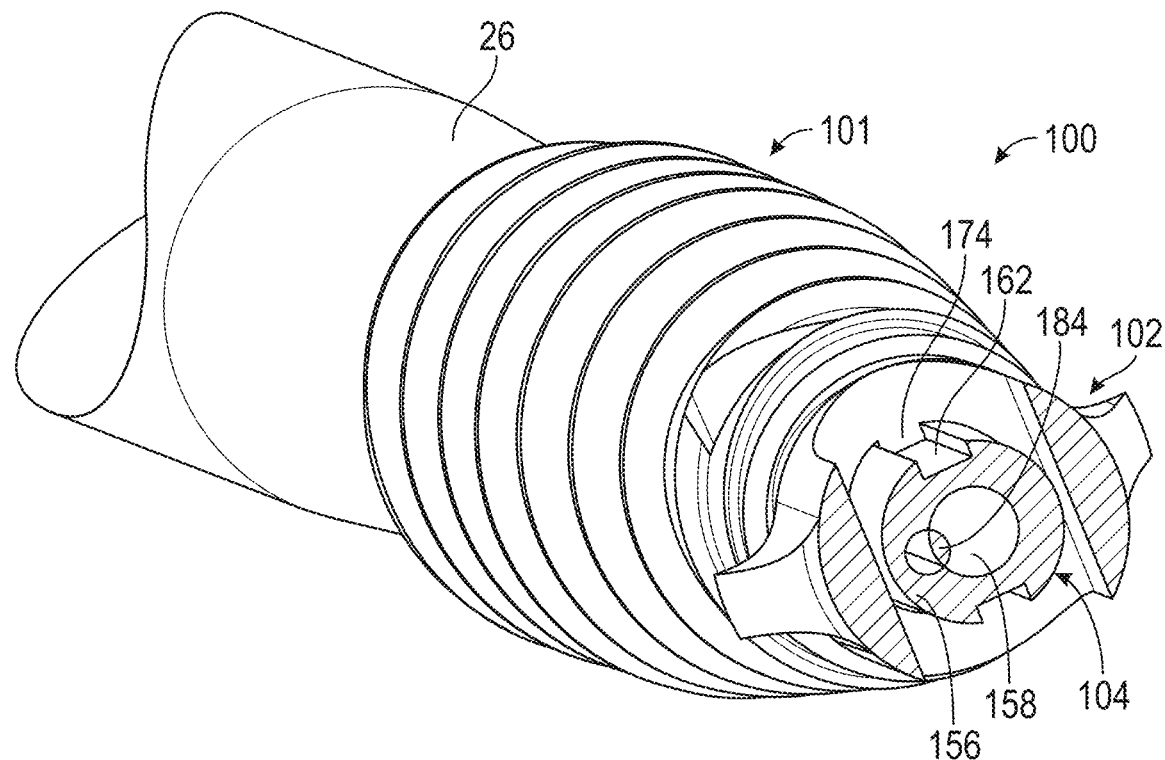
FIG. 12C is an end cross-sectional view of the cannulated fastener of FIG. 12A with the cannulated driver and a guide tube inserted therein.

FIG. 12C is a cross-sectional view of cannulated fastener 100 of FIG. 12A with shaft 26 of driver 14 and tube 104 inserted therein. Cannulation 172 of wing tip 102 can include rail 174 for riding within channel 162 of tube 104. Rail 174 and channel 162 can be circumferentially oriented on wing tip 102 and tube 104 such that engagement of rail 174 and channel 162 aligns slot 160 with cut-out 152. Before cannulated fastener 100 is engaged with bone bore 60, tube 104 can be extended through driver 14 so that slot 160 extends from tip 28 outside of cannulated fastener 100. Cinching suture 18 can be positioned in slot 160 so that knot 44C engages the outside of slot 160. Tube 104 can be used to position cinching suture 18 and knot 44C at bone bore 60 before cannulate fastener 100 is engaged with bone bore 60. Thus, slot 60 of tube 104 can be positioned within bone bore 60 and then cannulated fastener 60 can be slid down tube 104 to engage cut-out 152 with cinching suture 18 in alignment with slot 160. Engagement of rail 174 with channel 162 can help ensure that cut-out 152 comes down on cinching suture 18 at the same location of slot 160.

Figure 13A:
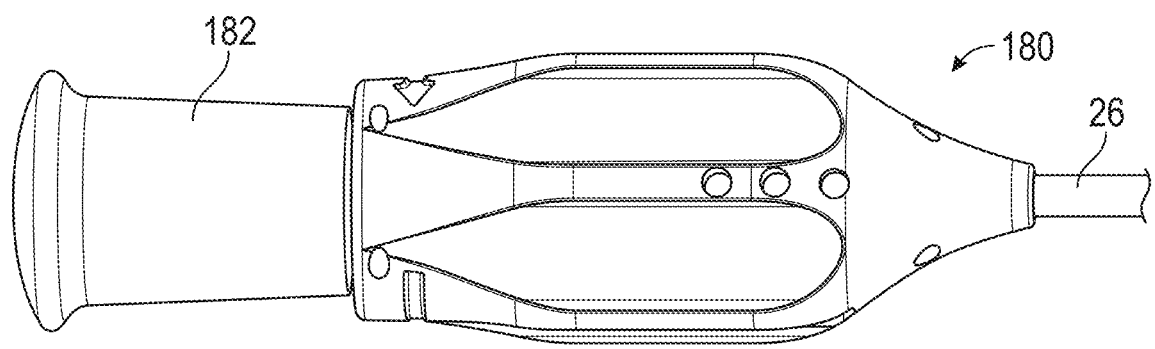
FIG. 13A is a side view of a handle with a knob for a cannulated driver for operating a fastener pin that can be inserted into the guide tube of FIGS. 12A and 12C.
Figure 13B:
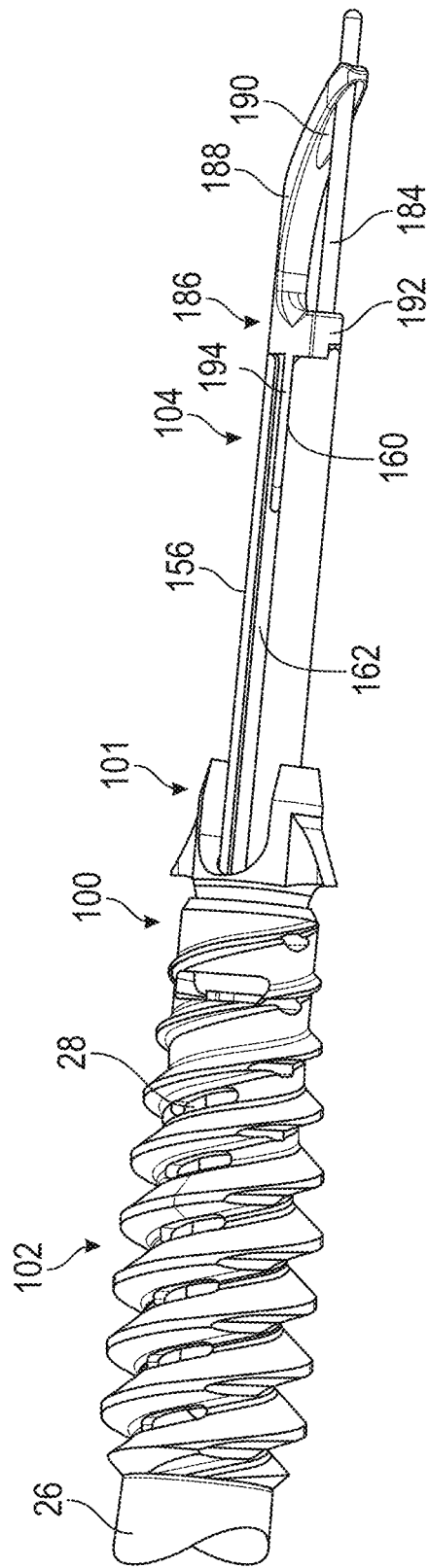
FIG. 13B is a side view of a distal end of the cannulated driver with the fastener pin and a suture hook attached to the guide tube.
Figure 13C:
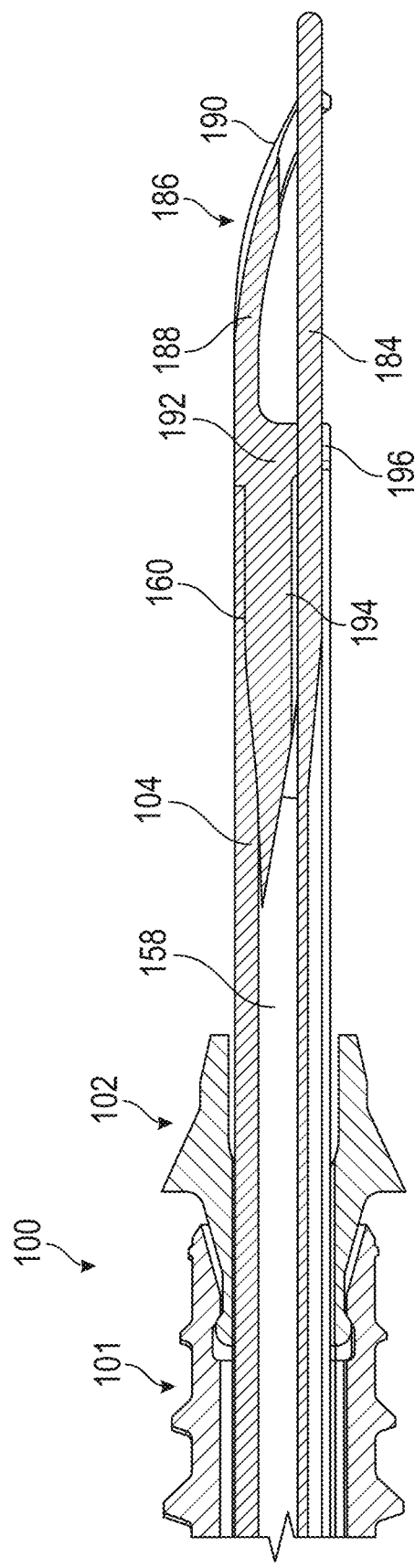
FIG. 13C is a side cross sectional view through the guide tube, fastener pin and suture hook of FIG. 13B.

FIG. 13A is a side view of handle 180 with knob 182 for driver 14 for operating fastener pin 184 that can be inserted into guide tube 104 of FIGS. 12A and 12C. FIG. 13B is a side view of a distal end of driver 14 with the fastener pin 184 and suture hook 186 attached to guide tube 104. FIG. 13C is a cross sectional view through guide tube 104, fastener pin 184 and suture hook 186 of FIG. 13B. Suture hook 186 can comprise shank 188, bore 190, base 192, extension 194 and aperture 196. FIGS. 13A-13C are discussed concurrently.

Fastener pin 184 and suture hook 186 can be used to provide additional functionality to tube 104. Suture hook 186 can be attached to tube 104 via insertion of extension 194 into slot 160. Base 192 can engage the distal end of tube 104 and can include aperture 196 to allow fastener pin 184 to pass therethrough. Extension 194 can be held in place with slot 160 via a snap-fit or interference fit and can be secured with a fastener.

Fastener pin 184 and suture hook 186 can be used to hold cinching suture 18 in engagement with tube 104. Knob 182 can be attached to fastener pin 184 such that knob 182 can be pulled proximally away from handle 180 to retract fastener pin 184 from bore 190. Thus, cinching suture 18 can be placed against shank 188. Knob 182 can be advanced distally toward handle 180 to insert fastener pin 184 back into bore 190, thereby capturing cinching suture 18. Thereafter, handle 180 can be rotated to position cinching suture 18 relative to bone bore 60 before cannulated fastener 100 is advanced along shaft 26 to engage cinching suture 18. After cannulated fastener 100 is fully seated within bone bore 60 and cinching suture 18 is attached to the bone, driver 14 can be separated from cannulated fastener 100 and removed from the anatomy. In order to withdraw tube 104 from bone bore 60, knob 182 can again be retracted proximally from handle 180 to withdraw fastener pin 184 from bore 190 to release cinching suture 18 and allow driver 14 to be removed.

The systems, devices and methods discussed in the present application can be useful in providing knotless suture anchors that can be readily implanted into bone to provide strong frictional engagement between tissue sutures and bone. The tissue sutures can provide interference between threading of the bone fastener of the tissue anchor and the bone material, thus allowing friction therebetween to inhibit or prevent movement of the tissue sutures. The suture anchors of the present disclosure can increase the interference of the tissue sutures by placing the tissue sutures deep into a bone bore. The suture anchors of the present disclosure can place an inflexion point of the tissue sutures, e.g., the point where the tissue sutures bend to extend out of the bone bore, at the distal tip of the bone fastener, thereby facilitating extension of two lengths of the tissue sutures, e.g., one on either side of the inflection point, along the entire length of the bone anchor. The tissue sutures of the present disclosure can operate without a knot or without a surgeon having to tie a knot during a procedure, thereby facilitating ease of use and reducing implantation time during the procedure.

EXAMPLES

Example 1 is a method of soft tissue repair, the method comprising: attaching at least one suture to a soft tissue to be affixed to a bone structure; positioning a tissue anchor on a driver; positioning a cinching suture alongside the driver; engaging a catch of the cinching suture with a stop of the driver; capturing the at least one suture attached to the soft tissue in a loop of the cinching suture positioned proximate a distal tip of the driver; drawing the at least one suture toward the distal tip of the driver by pulling at least a first portion of the cinching suture; preventing the cinching suture from passing by the driver by engaging the catch with the stop; and installing the tissue anchor into the bone structure to secure the at least one suture in the bone structure by interference-friction fixation between the tissue anchor and the bone structure.

In Example 2, the subject matter of Example 1 optionally includes wherein: positioning the tissue anchor on the driver comprises inserting a tip of the driver into a cannulation of a cannulated tissue anchor; positioning the cinching suture alongside the driver comprises positioning the cinching suture within a lumen of a cannulated driver; and engaging a catch of the cinching suture with the stop of the driver comprises disposing the catch of the cinching suture within a counterbore of the lumen of the cannulated driver.

In Example 3, the subject matter of Example 2 optionally includes wherein the counterbore extends into the lumen at the distal tip of the cannulated driver to form a shoulder that faces distally.

In Example 4, the subject matter of Example 3 optionally includes wherein: drawing the at least one suture to the lumen at the distal tip of the cannulated driver by pulling at least a first portion of the cinching suture comprises: pulling a first end portion of the cinching suture proximally along the lumen of the cannulated driver; and preventing the cinching suture from passing through the lumen by engaging the catch with the counterbore comprises: engaging a second portion of the cinching suture comprising the catch with the counterbore.

In Example 5, the subject matter of Example 4 optionally includes wherein pulling a first end portion of the cinching suture comprises: reducing a size of the loop to tighten the loop around the at least one suture.

In Example 6, the subject matter of Example 5 optionally includes wherein the catch of the cinching suture comprises a slip knot forming the loop in the cinching suture.

In Example 7, the subject matter of any one or more of Examples 5-6 optionally include wherein the catch of the cinching suture comprises a saddle of a sliding zip lock mechanism.

In Example 8, the subject matter of any one or more of Examples 4-7 optionally include wherein pulling a first end portion of the cinching suture comprises: drawing the catch into engagement with the shoulder of the counterbore.

In Example 9, the subject matter of Example 8 optionally includes wherein the catch of the cinching suture comprises a fixed knot in the cinching suture.

In Example 10, the subject matter of Example 9 optionally includes wherein pulling the first end portion of the cinching suture further comprises: reducing an open area of the loop by drawing a portion of the loop into the counterbore.

In Example 11, the subject matter of any one or more of Examples 3-10 optionally include wherein the cinching suture is positioned in a distal end of the lumen of the cannulated driver such that the catch is distal of the counterbore.

In Example 12, the subject matter of any one or more of Examples 2-11 optionally include wherein the counterbore extends into the lumen at a proximal portion of the cannulated driver to form a shoulder that faces proximally.

In Example 13, the subject matter of Example 12 optionally includes wherein: drawing the at least one suture to the lumen at the distal tip of the cannulated driver by pulling at least a first portion of the cinching suture proximally through the lumen of the cannulated driver comprises: pulling a first end of the cinching suture; and preventing the cinching suture from passing through the lumen by engaging at least a second portion of the cinching suture with the counterbore comprises: drawing a second end portion of the cinching suture distally to engage the catch of the cinching suture with the shoulder.

In Example 14, the subject matter of Example 13 optionally includes wherein the catch of the cinching suture comprises a stop attached to the cinching suture.

In Example 15, the subject matter of Example 14 optionally includes wherein the catch of the cinching suture comprises a knot in only one portion of the cinching suture.

In Example 16, the subject matter of any one or more of Examples 12-15 optionally include wherein the cinching suture is positioned in a proximal end of the lumen of the cannulated driver such that such that the catch is proximal of the counterbore.

In Example 17, the subject matter of any one or more of Examples 2-16 optionally include wherein installing the cannulated tissue anchor into the bone structure comprises: pushing the at least one suture and the loop of the cinching suture against the bone structure; and driving the cannulated tissue anchor into the bone structure with the cannulated driver.

In Example 18, the subject matter of Example 17 optionally includes forming a bore in a bone at a location at which the soft tissue is to be affixed; inserting the distal tip of the cannulated driver into the bore; and sliding the cannulated tissue anchor to the distal tip of the cannulated driver to contact the bone structure as the cannulated tissue anchor is pushed into the bone structure.

In Example 19, the subject matter of any one or more of Examples 17-18 optionally include wherein installing the cannulated tissue anchor into the bone structure comprises rotating the cannulated driver and the cannulated tissue anchor together.

In Example 20, the subject matter of any one or more of Examples 17-19 optionally include wherein installing the cannulated tissue anchor into the bone structure comprises capturing the at least one suture in a notch at a distal end of the cannulated tissue anchor.

In Example 21, the subject matter of any one or more of Examples 2-20 optionally include wherein: positioning the cannulated tissue anchor on the cannulated driver comprises pre-loading the cannulated tissue anchor onto the distal tip of the cannulated driver; and positioning the cinching suture in the lumen of the cannulated driver comprises pre-loading the cinching suture in the lumen of the cannulated driver.

Example 22 is a system for implanting soft tissue sutures into bone, the system comprising: a knotless anchor comprising: a fastener body; and a cannulation extending through the fastener body; a driver comprising: a cannulated shaft; a tip extending from the cannulated shaft that is configured to extend into the cannulation rotate the knotless anchor; a lumen extending through the cannulated shaft and the tip; and a radially extending surface in the lumen; and a cinching suture comprising: a first proximal end portion; a second proximal end portion; a distal loop connecting the first proximal end portion and the second proximal end portion; and a catch connected to at least one of the first proximal end portion and the second proximal end portion to engage the radially extending surface in the lumen.

In Example 23, the subject matter of Example 22 optionally includes where the radially extending surface comprises a counterbore of the lumen.

In Example 24, the subject matter of Example 23 optionally includes wherein the radially extending surface of the counterbore faces distally.

In Example 25, the subject matter of Example 24 optionally includes wherein the catch comprises a sliding knot connecting the first proximal end portion and the second proximal end portion of the cinching suture.

In Example 26, the subject matter of Example 25 optionally includes wherein the sliding knot comprises a Duncan loop.

In Example 27, the subject matter of any one or more of Examples 24-26 optionally include wherein the catch comprises a fixed knot connecting the first proximal end portion and the second proximal end portion of the cinching suture.

In Example 28, the subject matter of Example 27 optionally includes wherein the tip comprises a sidewall defining the counterbore, the sidewall having an axial length longer than a length of the fixed knot.

In Example 29, the subject matter of any one or more of Examples 24-28 optionally include wherein the catch comprises a sliding saddle joint connecting the first proximal end portion and the second proximal end portion of the cinching suture.

In Example 30, the subject matter of Example 29 optionally includes wherein the sliding saddle joint comprises a zip lock mechanism connecting the first proximal end portion and the second proximal end portion of the cinching suture.

In Example 31, the subject matter of any one or more of Examples 24-30 optionally includes the counterbore being located within 10.0 millimeters of a distal end of the tip.

In Example 32, the subject matter of any one or more of Examples 23-31 optionally include wherein the radially extending surface of the counterbore faces proximally.

In Example 33, the subject matter of Example 32 optionally includes wherein the catch comprises a knot in one of the first proximal end portion and the second proximal end portion of the cinching suture.

In Example 34, the subject matter of any one or more of Examples 32-33 optionally include wherein the catch comprises a stop attached to one of the first proximal end portion and the second proximal end portion of the cinching suture.

In Example 35, the subject matter of any one or more of Examples 22-34 optionally include wherein a distal end of the fastener body comprises a notch to receive graft or tissue sutures.

In Example 36, the subject matter of any one or more of Examples 22-35 optionally include wherein the cannulation of the knotless anchor and the tip of the driver comprise mating cross-sectional profiles.

In Example 37, the subject matter of any one or more of Examples 22-36 optionally include a soft anchor attached to the cinching suture.

In Example 38, the subject matter of any one or more of Examples 22-37 optionally include an enlarger device attached to the cinching suture.

In Example 39, the subject matter of any one or more of Examples 22-38 optionally include a rotatable wing tip attached to the fastener body.

In Example 40, the subject matter of any one or more of Examples 22-39 optionally include the cannulated shaft including a slot at the tip.

Each of these non-limiting examples can stand on its own, or can be combined in various permutations or combinations with one or more of the other examples.

Various Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the The claimed invention is:

1. A method of soft tissue repair, the method comprising:
attaching at least one suture to a soft tissue to be affixed to a bone structure;
positioning a tissue anchor on a driver;
positioning a cinching suture alongside the driver;
engaging a catch of the cinching suture with a stop of the driver;
capturing the at least one suture attached to the soft tissue in a loop of the cinching suture positioned proximate a distal tip of the driver;
drawing the at least one suture toward the distal tip of the driver by pulling at least a first portion of the cinching suture;
preventing the cinching suture from passing by the driver by engaging the catch with the stop; and
installing the tissue anchor into the bone structure to secure the at least one suture in the bone structure by interference-friction fixation between the tissue anchor and the bone structure.

2. The method of claim 1, wherein:
positioning the tissue anchor on the driver comprises inserting a tip of the driver into a cannulation of a cannulated tissue anchor;
positioning the cinching suture alongside the driver comprises positioning the cinching suture within a lumen of a cannulated driver; and
engaging a catch of the cinching suture with the stop of the driver comprises disposing the catch of the cinching suture within a counterbore of the lumen of the cannulated driver.

3. The method of claim 2, wherein the counterbore extends into the lumen at the distal tip of the cannulated driver to form a shoulder that faces distally.

4. The method of claim 3, wherein:
drawing the at least one suture to the lumen at the distal tip of the cannulated driver by pulling at least a first portion of the cinching suture comprises:
pulling a first end portion of the cinching suture proximally along the lumen of the cannulated driver; and
preventing the cinching suture from passing through the lumen by engaging the catch with the counterbore comprises:
engaging a second portion of the cinching suture comprising the catch with the counterbore.

5. The method of claim 4, wherein pulling a first end portion of the cinching suture comprises:
reducing a size of the loop to tighten the loop around the at least one suture.

6. The method of claim 5, wherein the catch of the cinching suture comprises a saddle comprising a sleeve attached to the second portion of the suture, the sleeve having a passage to receive the first portion of the suture.

7. The method of claim 5, wherein the catch of the cinching suture comprises a slip knot forming the loop in the cinching suture.

8. The method of claim 7, further comprises an enlarging device attached to the at least one suture to enlarge a footprint of the slip knot.

9. The method of claim 7, further comprising a soft anchor positioned on the loop of the cinching suture, the soft anchor configured to compress in length and expand in diameter when the loop is cinched.

10. The method of claim 4, wherein:
pulling a first end portion of the cinching suture comprises drawing the catch into engagement with the shoulder of the counterbore;
the catch of the cinching suture comprises a fixed knot in the cinching suture; and
pulling the first end portion of the cinching suture further comprises reducing an open area of the loop by drawing a portion of the loop into the counterbore.

11. The method of claim 3, wherein the cinching suture is positioned in a distal end of the lumen of the cannulated driver such that the catch is distal of the counterbore.

12. The method of claim 2, wherein:
the counterbore extends into the lumen at a proximal portion of the cannulated driver to form a shoulder that faces proximally; and
the cinching suture is positioned in a proximal end of the lumen of the cannulated driver such that such that the catch is proximal of the counterbore.

13. The method of claim 12, wherein:
drawing the at least one suture to the lumen at the distal tip of the cannulated driver by pulling at least a first portion of the cinching suture proximally through the lumen of the cannulated driver comprises:
pulling a first end of the cinching suture; and
preventing the cinching suture from passing through the lumen by engaging at least a second portion of the cinching suture with the counterbore comprises:
drawing a second end portion of the cinching suture distally to engage the catch of the cinching suture with the shoulder.

14. The method of claim 12, wherein the catch of the cinching suture comprises a stop attached to the cinching suture or a knot in only one portion of the cinching suture.

15. The method of claim 2, wherein installing the cannulated tissue anchor into the bone structure comprises:
pushing the at least one suture and the loop of the cinching suture against the bone structure; and
driving the cannulated tissue anchor into the bone structure with the cannulated driver.

16. The method of claim 15, further comprising:
forming a bore in a bone at a location at which the soft tissue is to be affixed;
inserting the distal tip of the cannulated driver into the bore;
tensioning the at least one suture within the loop of the cinching suture; and
sliding the cannulated tissue anchor to the distal tip of the cannulated driver to contact the bone structure as the cannulated tissue anchor is pushed into the bone structure.

17. The method of claim 16, wherein installing the cannulated tissue anchor into the bone structure comprises rotating the cannulated driver and the cannulated tissue anchor together.

18. The method of claim 16, wherein installing the cannulated tissue anchor into the bone structure comprises capturing the at least one suture in a notch at a distal end of the cannulated tissue anchor.

19. The method of claim 18, further comprising implanting a winged distal tip of the cannulated tissue anchor into bore to allow a body of the cannulated tissue anchor to be rotated in the bore while the winged distal tip and the at least one suture captured in the notch are inhibited from rotating.

20. The method of claim 18, further comprising inserting a notched tube through the cannulated driver to hold the cinching suture at a fixed radial position at the bore.

21. The method of claim 2, wherein:
positioning the cannulated tissue anchor on the cannulated driver comprises pre-loading the cannulated tissue anchor onto the distal tip of the cannulated driver; and
positioning the cinching suture in the lumen of the cannulated driver comprises pre-loading the cinching suture in the lumen of the cannulated driver.

\* \* \* \* \*